United States Patent
Khadloya et al.

(10) Patent No.: US 12,505,188 B2
(45) Date of Patent: *Dec. 23, 2025

(54) REFERENCE IMAGE ENROLLMENT AND EVOLUTION FOR SECURITY SYSTEMS

(71) Applicant: Nice North America LLC, Carlsbad, CA (US)

(72) Inventors: Krishna Khadloya, San Jose, CA (US); Manuel Gonzalez, San Jose, CA (US)

(73) Assignee: Nice North America LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,370

(22) Filed: Jan. 30, 2024

(65) Prior Publication Data
US 2024/0184868 A1    Jun. 6, 2024

Related U.S. Application Data

(63) Continuation of application No. 17/200,584, filed on Mar. 12, 2021, now Pat. No. 11,921,831.

(51) Int. Cl.
*G06F 21/32* (2013.01)
*G06F 18/22* (2023.01)
(Continued)

(52) U.S. Cl.
CPC .............. *G06F 21/32* (2013.01); *G06F 18/22* (2023.01); *G06N 3/08* (2013.01); *G06V 20/56* (2022.01); *G06V 40/172* (2022.01)

(58) Field of Classification Search
CPC ....... G06F 21/32; G06F 18/22; G06V 40/172; G06V 20/56; G06N 3/08
(Continued)

(56) References Cited

U.S. PATENT DOCUMENTS 5,835,616 A    11/1998 Lobo et al.
6,111,517 A     8/2000 Atick et al.
(Continued)

FOREIGN PATENT DOCUMENTS

CN     108304827 A    7/2018
KR    20090018440 A    2/2009
(Continued)

OTHER PUBLICATIONS

U.S. Appl. No. 17/200,584, filed Mar. 12, 2021, Enrollment System with Continuous Learning and Confirmation.
(Continued)

*Primary Examiner* — Dant B Shaifer Harriman
(74) *Attorney, Agent, or Firm* — Fox Rothschild LLP

(57) ABSTRACT

Person or object authentication can be performed using artificial intelligence-enabled systems. Reference information, such as for use in comparisons or assessments for authentication, can be updated over time to accommodate changes in an individual's appearance, voice, or behavior. In an example, reference information can be updated automatically with test data, or reference information can be updated conditionally, based on instructions from a system administrator. Various types of media can be used for authentication, including image information, audio information, or biometric information. In an example, authentication can be performed wholly or partially at an edge device such as a security panel in an installed security system.

19 Claims, 10 Drawing Sheets

(51) Int. Cl.
  *G06N 3/08* (2023.01)
  *G06V 20/56* (2022.01)
  *G06V 40/16* (2022.01)
(58) Field of Classification Search
  USPC .......................................................... 726/2
  See application file for complete search history.

(56) References Cited

U.S. PATENT DOCUMENTS

| | | | |
|---|---|---|---|
| 7,130,454 B1 | 10/2006 | Berube et al. | |
| 7,178,025 B2 | 2/2007 | Scheidt et al. | |
| 7,634,662 B2 | 12/2009 | Monroe | |
| 7,784,680 B1* | 8/2010 | Mason | G07F 19/207 |
| | | | 358/1.14 |
| 7,817,013 B2 | 10/2010 | Bazakos et al. | |
| 8,090,160 B2 | 1/2012 | Kakadiaris et al. | |
| 8,311,293 B2 | 11/2012 | Okada | |
| 8,559,684 B1 | 10/2013 | Nechyba | |
| 8,614,673 B2 | 12/2013 | Binder | |
| 8,730,029 B2 | 5/2014 | Petricoin, Jr. | |
| 8,842,889 B1 | 9/2014 | Konoplev et al. | |
| 8,913,798 B2 | 12/2014 | Kim et al. | |
| 9,014,514 B2* | 4/2015 | Boncyk | A63F 13/45 |
| | | | 382/305 |
| 9,030,562 B2 | 5/2015 | Petricoin, Jr. | |
| 9,542,390 B2 | 1/2017 | Shankaranarayana | |
| 9,959,694 B2 | 5/2018 | Lindsay | |
| 10,074,024 B2 | 9/2018 | El Kaliouby et al. | |
| 10,157,537 B1 | 12/2018 | Coxwell | |
| 10,210,381 B1 | 2/2019 | Mostafa et al. | |
| 10,331,941 B2 | 6/2019 | Rhee et al. | |
| 10,387,739 B2 | 8/2019 | Han et al. | |
| 10,482,345 B2* | 11/2019 | Jouhikainen | H04N 21/812 |
| 10,699,169 B2* | 6/2020 | Kang | G06V 10/80 |
| 11,159,560 B1* | 10/2021 | Limb | G06N 3/04 |
| 11,210,502 B2 | 12/2021 | Zheng | |
| 11,502,841 B2* | 11/2022 | Streit | G06N 3/044 |
| 11,527,089 B2* | 12/2022 | Desai | G06F 17/15 |
| 2002/0097145 A1 | 7/2002 | Tumey et al. | |
| 2003/0004881 A1* | 1/2003 | Shinzaki | H04L 63/083 |
| | | | 705/51 |
| 2003/0138135 A1* | 7/2003 | Chung | G07C 13/00 |
| | | | 382/119 |
| 2004/0151347 A1 | 8/2004 | Wisniewski | |
| 2004/0239481 A1 | 12/2004 | Beenau et al. | |
| 2005/0220326 A1* | 10/2005 | Sim | G06Q 20/341 |
| | | | 382/118 |
| 2006/0158307 A1 | 7/2006 | Lee et al. | |
| 2006/0222210 A1* | 10/2006 | Sundaram | G06F 18/28 |
| | | | 704/E17.006 |
| 2008/0209545 A1* | 8/2008 | Asano | H04L 9/3273 |
| | | | 726/19 |
| 2008/0317298 A1* | 12/2008 | Shah | G06V 10/98 |
| | | | 382/118 |
| 2010/0017389 A1 | 1/2010 | Ogunbona et al. | |
| 2010/0201498 A1* | 8/2010 | Griffin | G06F 21/32 |
| | | | 340/10.52 |
| 2010/0316293 A1* | 12/2010 | Claussen | G06V 10/7715 |
| | | | 382/170 |
| 2011/0150278 A1 | 6/2011 | Shimizu | |
| 2013/0070976 A1* | 3/2013 | Myers | G06V 40/169 |
| | | | 382/118 |
| 2013/0223696 A1 | 8/2013 | Azar et al. | |
| 2014/0016837 A1 | 1/2014 | Nechyba et al. | |
| 2014/0055553 A1* | 2/2014 | Lee | G06V 10/95 |
| | | | 348/14.07 |
| 2014/0247963 A1 | 9/2014 | Lin et al. | |
| 2016/0191995 A1 | 6/2016 | El Kaliouby et al. | |
| 2016/0335861 A1* | 11/2016 | Shimura | H04N 7/188 |
| 2017/0206272 A1* | 7/2017 | Neela | G06F 16/3343 |
| 2017/0289144 A1* | 10/2017 | Ionita | G06F 21/629 |
| 2018/0004924 A1 | 1/2018 | Tieu | |
| 2018/0232902 A1* | 8/2018 | Albadawi | A61B 5/0205 |
| 2018/0285629 A1* | 10/2018 | Son | G06V 10/809 |
| 2018/0293429 A1 | 10/2018 | Wechsler et al. | |
| 2019/0122024 A1 | 4/2019 | Schwartz et al. | |
| 2019/0147156 A1 | 5/2019 | Burri et al. | |
| 2019/0147676 A1 | 5/2019 | Madzhunkov et al. | |
| 2019/0197247 A1* | 6/2019 | Anderson | H04L 67/60 |
| 2019/0272415 A1* | 9/2019 | Miao | G06F 16/1748 |
| 2019/0295267 A1 | 9/2019 | Cheng et al. | |
| 2019/0332884 A1 | 10/2019 | Siddiqui | |
| 2020/0128004 A1 | 4/2020 | Shattuck et al. | |
| 2020/0193201 A1 | 6/2020 | Liu et al. | |
| 2020/0364479 A1* | 11/2020 | Tseng | G06V 10/761 |
| 2021/0319212 A1* | 10/2021 | Debnath | G06V 40/172 |
| 2021/0326616 A1* | 10/2021 | Lee | G06V 10/82 |
| 2022/0292170 A1 | 9/2022 | Khadloya et al. | |
| 2023/0063229 A1* | 3/2023 | Vemulapalli | G06V 40/172 |
| 2023/0126806 A1 | 4/2023 | Kim et al. | |
| 2025/0078567 A1* | 3/2025 | Schillen | G06V 40/172 |

FOREIGN PATENT DOCUMENTS

| | | |
|---|---|---|
| KR | 101998112 B1 | 7/2019 |
| KR | 102067947 B1 | 1/2020 |
| WO | WO-2015122789 A1 | 8/2015 |
| WO | WO-2016011204 A1 | 1/2016 |

OTHER PUBLICATIONS

"7th World Machine Learning and Deep Learning Congress Brochure", Conference Series LLC Ltd, [Online] Retrieved from the Internet: <URL: https://machinelearning.conferenceseries.com/conference-brochure.php>, (Retrieved on Jun. 3, 2020), 5 pgs.

"Access Control Through Face Recognition", FaceFirst, [Online] Retrieved from the Internet: <URL: https://www.facefirst.com/solutions/access-control-through-face-recognition-2/>, (Retrieved on Jun. 3, 2020), 8 pgs.

"U.S. Appl. No. 17/200,584, Non Final Office Action mailed Jul. 28, 2023", 35 pgs.

"U.S. Appl. No. 17/200,584, Notice of Allowance mailed Oct. 30, 2023", 16 pgs.

"U.S. Appl. No. 17/200,584, Response filed Oct. 12, 2023 to Non Final Office Action mailed Jul. 28, 2023", 11 pgs.

"European Application Serial No. 22161159.3, Extended European Search Report mailed Jul. 22, 2022", 9 pgs.

"European Application Serial No. 22161159.3, Response filed Mar. 7, 20023 to Extended European Search Report mailed Jul. 22, 2022", 23 pgs.

"Face Authentication HIDL", Android Open Source Project, [Online] Retrieved from the Internet: <URL: https://source.android.com/security/biometric/face-authentication>, (May 4, 2020), 6 pgs.

"Face Recognition System", Agrex Technologies Private Limited, [Online] Retrieved from the Internet: <URL: https://agrexai.com/face-recognition-system/>, (Retrieved on Jun. 3, 2020), 4 pgs.

"Facial Recognition Access Management", Findface by NTech Lab, [Online] Retrieved from the Internet: <URL: https://findface.pro/en_in/cases/access-management/>, (Retrieved on Jun. 3, 2020), 4 pgs.

"Facial Recognition can secure Commercial Facilities in 5 Great Ways", Umbrella Technologies, [Online] Retrieved from the Internet: <URL: https://umbrellatech.co/5-ways-facial-recognition-can-secure-commercial-facilities/>, (Jun. 17, 2019), 12 pgs.

"Facial recognition: top 7 trends (tech, vendors, markets, use cases and latest news)", Thales Group, [Online] Retrieved from the Internet: <URL: https://www.thalesgroup.com/en/markets/digital-identity-and-security/government/biometrics/facial-recognition>, (2020), 26 pgs.

"Find X Face and Passcode Features", OPPO Global, [Online] Retrieved from the Internet: <URL: https://oppo.custhelp.com/app/answers/detail/a_id/2541/~/find-x-face-and-passcode>, (Retrieved on Jun. 3, 2020), 15 pgs.

"How to use Face Recognition?", Huawei Support UK, [Online] Retrieved from the Internet: <URL: https://consumer.huawei.com/uk/support/faq/how-to-use-face-recognition/>, (Retrieved on Jun. 3, 2020), 6 pgs.

(56) References Cited

OTHER PUBLICATIONS

"Opinion Feb. 2012 on facial recognition in online and mobile services", European Commission, Article 29 of Directive 95/46/EC—Data Protection Working Party, [Online] Retrieved from the Internet: <URL: https://ec.europa.eu/justice/article-29/documentation/opinion-recommendation/files/2012/wp192_en.pdf>, (Mar. 22, 2012), 10 pgs.

"Sentinel-IQ Face Recognition Platform", FaceFirst, [Online] Retrieved from the Internet: <URL: https://www.facefirst.com/solutions/surveillance-face-recognition/>, (Retrieved on Jun. 3, 2020), 10 pgs.

Aleluya, Earl Ryan M, et al., "Faceture ID: face and hand gesture multi-factor authentication using deep learning", Procedia Computer Science 135, (2018), 147-154.

Choi, Hyunsoek, et al., "A Multimodal User Authentication System Using Faces and Gestures", Hindawi Publishing Corp., BioMed Research International vol. 2015, Article ID 343475, (2015), 8 pgs.

Delac, Kresimir, Ed., et al., "Face Recognition", I-TECH Education and Publishing, (2007), 570 pgs.

Farag, Mostafa A, "Face recognition in the wild", U. of Louisville, Electronic Theses and Dissertations, Paper 2278, [Online] Retrieved from the Internet: <URL: https://ir.library.louisville.edu/cgi/viewcontent.cgi?article=3352&context=etd>, (2013), 123 pgs.

Mahdi, Fahad Parvez, et al., "Face recognition-based real-time system for surveillance", Intelligent Decision Technologies 11, (2017), 79-92.

Pantic, Maja, et al., "Automatic Analysis of Facial Expressions: The State of the Art", IEEE Transactions on Pattern Analysis and Machine Intelligence, 22(12), (Dec. 2000), 1424-1445.

Roux, Melissa, "How Biometric Facial Recognition is improving security", SightCorp, [Online] Retrieved from the Internet: <URL: https://sightcorp.com/blog/how-biometric-facial-recognition-is-improving-security/>, (Mar. 23, 2019), 4 pgs.

Rovai, Marcelo J, "Real-time Face Recognition: an End-to-end Project", Instructables, [Online] Retrieved from the Internet: <URL: https://www.instructables.com/id/Real-time-Face-Recognition-an-End-to-end-Project/>, (Retrieved on Jun. 3, 2020), 25 pgs.

Sato, Atsushi, et al., "Advances in Face Detection and Recognition Technologies", NEC J. of Adv. Tech., 2(1), (2005), 28-34.

Singh, D Narendar, et al., "IOT Based Automated Attendance with Face Recognition System", Intl. Journal of Innovative Technology and Exploring Engineering (IJITEE), 8(6S4), (Apr. 2019), 450-456.

Vance, Mike, "How Facial Recognition Can Provide Secure Access for K-12 Schools", Campus Security and Life Safety, [Online] Retrieved from the Internet: <URL: https://campuslifesecurity.com/articles/2019/04/01/how-facial-recognition-can-provide-secure-access-for-k-12-schools.aspx?m=1>, (Apr. 2019), 4 pgs.

* cited by examiner

REFERENCE IMAGE ENROLLMENT AND EVOLUTION FOR SECURITY SYSTEMS

CLAIM OF PRIORITY

This application is a continuation of U.S. application Ser. No. 17/200,584, filed Mar. 12, 2021, which is hereby incorporated by reference herein in its entirety.

BACKGROUND

Safety and security in home, office, and other settings is increasingly a concern for individuals, business owners, municipalities, and others. In addition, with increases in business and leisure travel, people may leave homes or businesses unoccupied or unattended for longer periods of time, which can be inviting to thieves. Various tools are available to help mitigate potential losses, such as security systems with window and door sensors, motion sensors, surveillance systems, access control systems, smart home systems, and the like. Some security systems include or use video surveillance, such as using video cameras that can be deployed indoors or outdoors. Such video or image-based systems can reside locally, with cameras and recording media stored locally. In an example, other systems can be distributed with image capture or camera devices locally deployed and storage or processing located remotely. In an example, image or video information from a security system is stored in the cloud.

In some security systems equipped with one or more cameras or microphones, users can access image or audio information on-demand, or a system can be configured to record or store image or audio information continuously or selectively. For example, a security system can be configured to record image or video or audio information when a camera detects movement in a monitored area. Depending on factors such as a camera location and environment, a motion-based event generation system can generate hundreds of events per day. As a number of events grows, it can be difficult for a user to process the resulting volume of event information made available by the system.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
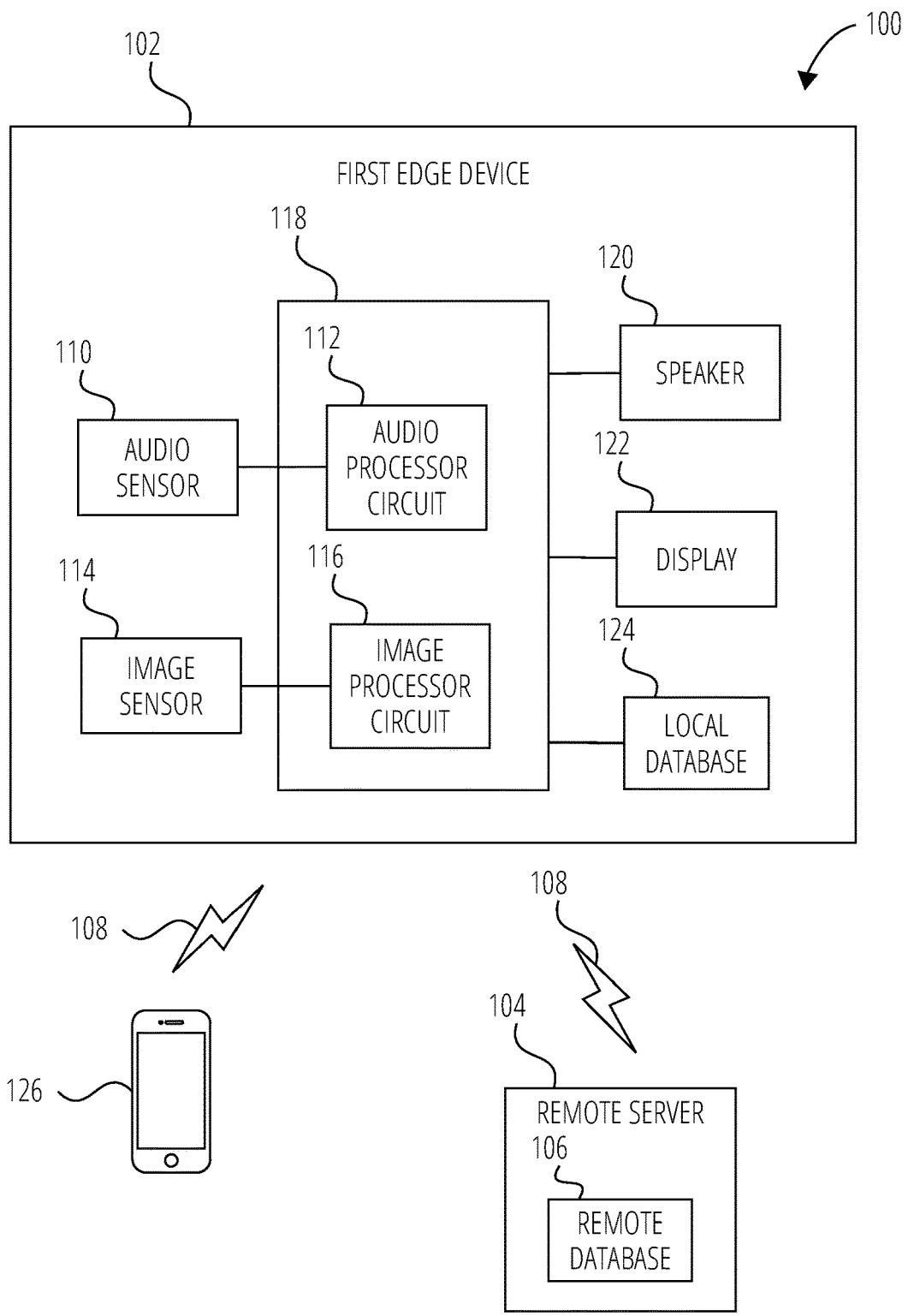
FIG. 1 illustrates generally an example of a first system that includes an edge device, a remote server, and a user device.

Example methods and systems discussed herein are directed to enrollment and user authentication for security devices, systems, or access control systems. The various examples discussed herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Traditional security systems monitor an environment and alert a single entity, such as a property owner or service provider, in response to a security breach. The present inventors have recognized, among other things, that a problem to be solved includes preventing false alarms of a security breach. The present inventors have recognized that the problem can further include providing a security system that can use image information or acoustic information to identify or anticipate a security breach. The present inventors have further recognized that authentication of a user, such as to grant or deny user access to a protected environment, can be performed using various media, such as image information or acoustic information or biometric information, that is about or from a user. The present inventors have further recognized that user characteristics such as appearance, voice, or biosignals, can change or evolve over time and a security system that uses such characteristics for authentication can correspondingly evolve. Systems and methods discussed herein can include security or authentication systems that can use information about or from a user over time to provide uninterrupted and secure access control.

In an example, a solution to these and other problems can include systems and methods for authentication that can receive reference information about a target object, such as image information or acoustic information corresponding to the target object. The target object can be a person or an inanimate object. The reference information can include previously validated or known-good information about the target object. The solution can include receiving information about a candidate object, such as image information or audio information about a candidate object to be authenticated. The information about the candidate object can include image information or acoustic information corresponding to the candidate object. The solution can further include determining a relatedness metric indicating a magnitude of relatedness of the target object and the candidate object. The relatedness metric can be determined, for example, using machine learning or using a neural network-based classifier that is trained on various image or audio information and configured to determine a relatedness. The solution can further include using a value of the determined relatedness metric to generate updated or new reference information about the target object. The solution can further include using a value of the determined relatedness metric to trigger a validation request, such as can be provided to an administrator of a security system. The validation request can be provided when the relatedness metric indicates some level of uncertainty about the candidate object corresponding to the reference or target object. The validation request can, for example, include image information about the target object (e.g., including an image of an enrolled or credentialed individual) or information about the candidate object (e.g., including an image of an individual seeking access to a protected area). The administrator can evaluate the information in the validation request and choose whether to, for example, grant or deny access to a protected environment. In some examples, the solution can include updating the reference information about the target object based on a response to the validation request.

In an example, the solution can include a security system, or processor coupled to a security system, and can use processor-implemented artificial intelligence to analyze or respond to information from an audio sensor, from an image sensor, or from a combination of audio, video, and/or other monitoring sensors such as thermostat or other environment condition sensors, door sensors, window sensors, lock sensors, etc. The processor-implemented artificial intelligence, as used herein, generally includes one or both of machine learning and deep learning. In some instances, one or the other of machine learning and deep learning can be used or implemented to achieve a particular result. Accordingly references herein to one or the other of machine learning and deep learning can be understood to encompass one or both forms of artificial intelligence processing.

Classical or traditional machine learning (sometimes referred to herein as "ML" or "classical ML") can include or use algorithms such as Bayes Decision, Regression, Decision Trees/Forests, Support Vector Machines, or Neural Networks, among others. Deep learning (sometimes referred to herein as "DL") can be based on deep neural networks and can use multiple layers, such as convolution layers. Such DL, such as using layered networks, can be efficient in their implementation and can provide enhanced accuracy relative to classical ML techniques. In practice, DL algorithms can be more computationally demanding than classical ML algorithms. In an example, classical machine learning (ML) can be distinguished from deep learning (DL). Generally, DL models can outperform classical ML models. However, DL models can consume a relatively larger amount of processing or power resources, and such resources can be scarce on embedded platforms such as platforms without dedicated graphics processing cores.

In an example, an audio classification technique can include or use a two-stage approach. In a first stage, a classical ML model can be used, such as a Support Vector Machines (SVM) model or technique. Other models such as Logistic Regression, Decision Trees, Neural networks, or others can be used. In a second stage, a DL model can be based on a Convolutional Neural Network (CNN), for example, using a 48×96 spectrogram. The DL model can be optimized to balance the competing requirements of accuracy and edge processing on embedded devices that can be power limited. In an example, devices that include an embedded co-processor such as a DSP or GPU can execute classification techniques using more complicated models. In an example, the audio classification technique can include using a loudness detector to optimize computation time and processing resource usage. For example, the loudness detector can be used to identify sounds that have greater than a specified threshold loudness characteristic such that only sufficiently loud sounds are further processed. When a sufficiently loud sound is detected, then subsequent steps of feature extraction and machine learning and/or deep learning-based classifications can be performed.

Various algorithms can be employed by computers (devices, machines, systems, etc.) to automatically and accurately detect human bodies in images and/or video received from a camera, or to detect the presence of a human using audio information. In an example, deformable part-based models of Histogram of Oriented Gradients (HOG) features, such as combined with latent Support Vector Machines (SVM) techniques, can be used to detect one or more individuals or human bodies in an image. Part-based human detection can be used to localize various body parts of an individual in an image. In an example, part-based detection uses root filters and part filters.

In an example, human detection using machines to analyze image or audio information includes model training and detection. Training can be an offline step where a machine learning algorithm (such as a CNN) is trained on various training data to learn human and non-human forms or features from various image information or acoustic information or biometrics or physiologic information. In an example, image-based detection can use one or more machine learning models to classify human and non-human regions in an image or frame. Acoustic-based detection can use one or more machine learning models to classify human speech or other acoustic information (e.g., breathing noises, audible footsteps or related movement cadence information) in an audio sample. In an example, the detection is performed using a pre-processing step of identifying potential regions in an image or portions of an audio sample for presence of a human and a post-processing step of validating the identified potential image regions or audio sample portions. In the detection step, part-based detectors can be used in the identified image region(s) by a root filter such as to localize, or provide information about a location of, each human body part. In the detection step, time-domain or frequency-domain analyzers can be used to process the audio sample portions to identify a presence of a human or of a particular human from among a group of known humans.

In an example, filters and deformable part-based models or algorithms can be used together to model a human appearance more accurately and in a more robust manner. Various examples of the filters can include HoG or HoG-like filters. Models can be trained by a latent SVM formulation where latent variables usually specify an object of interest (e.g., a human, or a portion of a human such as a face or head), such as including relative geometric positions of parts of a human.

In an example, a root filter can be trained for an entire human body and part filters can be separately trained within regions of different root filters using latent SVM techniques. In an example, a model includes root filters that cover the target object and part models that cover smaller parts of the target object. The part models in turn include their respective filters, relative locations and a deformation cost function. To detect a human face in an image, an overall score can be computed for each root location, and higher relative score locations can be considered as candidate locations for the human face or facial features. Other techniques can similarly be used.

FIG. 1 illustrates generally an example of a first system 100 that includes a first edge device 102, a remote server 104, and a user device 126. In an example, the first system 100 can be part of at least one of a surveillance system, a security system, a traffic monitoring system, a home security system, a toll fee system, or the like. At least one of the first edge device 102 and the remote server 104 can include a processor circuit configured to perform user recognition or authentication. The first edge device 102 can include, for example, a security system panel for an installed security system. The first edge device 102 can include a processor circuit 118 such as can include one or more processing cores, and each core can have a respective different function. In an example, the processor circuit 118 is a notional circuit that includes multiple different discrete processor circuits or cores that are coupled by an interface.

In the example of FIG. 1, the processor circuit 118 includes an audio processor circuit 112 and an image processor circuit 116. The first system 100 includes an audio sensor 110 such as a microphone that can receive audio signals and provide audio signal information to the audio processor circuit 112. The first system 100 includes an image sensor 114 such as a camera that can receive image signals and provide image information to the image processor circuit 116. Although the present discussion includes or refers to the first edge device 102, it can be understood that an audio-only device or image-only or biosignal-only monitoring or security device can be provided with the same or similar hardware and/or software and can exclude one or the other of the audio sensor 110 or the image sensor 114.

In an example, the audio processor circuit 112 can be a dedicated hardware unit configured to process audio, while in other examples, the audio processor circuit 112 can be a software-implemented module that is executed on the same or different processor circuit as other functions. In an example, the audio sensor 110 includes one or more microphones, such as an array of microphones, configured to receive one or more audio input signals such as from a user or from various non-user-based occurrences in an environment. In an example, one or more signals from the audio sensor 110 can be processed for noise reduction, feedback elimination, beam forming, or automatic gain control.

In an example, the image sensor 114 includes a sensor with a particular field of view (FOV). In an example, the image sensor 114 includes two 180 degree view sensors, such as can be joined back-to-back to provide a 360 degree view of an environment. In another example, the image sensor 114 includes a camera providing a 180 degree view in a horizontal direction. Such a single camera can be configured to rotate or look in a circular manner around the environment, and an image generated by such camera can be warped and de-warped for analysis or display purposes.

The first system 100 can be configured to perform audio-based and/or image-based and/or biometric-based recognition functions. For example, the processor circuit 118 can use information from the image sensor 114 to perform facial recognition, such as to identify a presence or absence of authorized or unauthorized individuals or objects, or can use information from the audio sensor 110 to perform audio or acoustic recognition, such as to identify the presence or absence of various individuals, events, or objects. The processor circuit 118 can be communicatively coupled to the remote server 104 using a network 108. The network 108 can be any suitable wired network, wireless network, or a combination of wired, wireless, or other network. In an example, the network 108 includes a LAN or wireless LAN connection, an internet connection, a point-to-point connection, or other network connection and combinations thereof. The network 108 can be any other type of network that is configured to transmit or receive data from host computers, personal devices, telephones, or any other electronic devices. The network 108 can be a combination of an enterprise network (or the Internet) and a cellular network, in which case, suitable systems and methods are employed to seamlessly communicate between the networks, and a mobile switching gateway can be used to communicate with a computer network gateway to pass data between the networks. The network 108 can include or use any software, hardware, or computer applications that can provide a medium to exchange signals or data in various formats. In an example, some or all of the recognition functions performed by the first system 100 can be performed at or using systems, devices, or processors that are remote from the first edge device 102, such as at the remote server 104.

The first edge device 102 can include a display 122 for displaying information generated by the processor circuit 118, and a speaker 120 for providing audible information generated by the processor circuit 118, such as including audible responses to user inquiries. In an example, the display 122 or the speaker 120 can be part of a computing device, such as a personal computer, a laptop, a smart phone, and the like, such as can be in data communication with the processor circuit 118 or other aspect of the first edge device 102.

In an example, the audio sensor 110, the audio processor circuit 112, and optionally the speaker 120, can be integrated in a single device, sometimes referred to as an audio assistant, an intelligent audio assistant device, a voice-controlled virtual assistant, or a user-controlled virtual assistant. In an example, the image sensor 114, the image processor circuit 116, and optionally the display 122, can be integrated together in a single device, sometimes referred to as a video assistant or an intelligent video assistant device. In an example, the intelligent video assistant device can be communicatively coupled to an intelligent audio assistant device using an interface that couples the processor circuits. In the example illustrated in FIG. 1, the processor circuit 118, the audio sensor 110, the image sensor 114, the display 122, and the speaker 120 can be integrated together to form a device referred to herein as the first edge device 102. The first edge device 102 can optionally include a local database 124 such as can include a long-term or short-term memory circuit.

Artificial intelligence-based analysis of information from the audio sensor 110 or the image sensor 114 can be performed locally in the first edge device 102 using the processor circuit 118 or can be performed elsewhere, such as using the remote server 104. In an example, the audio processor circuit 112 and/or the remote server 104 can include or access the local database 124 or the remote database 106, such as can be configured to store, among other things, various media, object template data, audio signature data, image data, and other information. In an office environment, the databases can store information about one or more employees, including names, roles, permitted or expected in/out times, designations, accessible systems, contact lists, calendars, etc. In an example, valid and recognizable users of a system can be predefined or enrolled or identified by the first edge device 102 and saved in one or both of the databases. In an example, the local database 124 or the remote database 106 can be in communication with office enterprise servers to access office data of one or more users.

In an example, the audio processor circuit 112 can process audio information from one or more users, either locally or using the remote server 104. Thereafter, the processor circuit 118 and/or the remote server 104 can use the audio information to decipher user requests and actions, and automatically service one or more user requests.

In an example, the first edge device 102 can perform an identification, authentication or recognition algorithm on image or audio or biometric signals. The algorithm can include voice recognition to identify a person from a characteristic of his or her voice. Voice recognition can be used to determine who is speaking and/or to determine what is being said. Identification of a person who is speaking can be referred to as "speaker recognition" and identification of what is being said can be referred to as "speech recognition." In an example, recognizing a speaking individual can simplify the task of translating speech in systems that have been trained on a specific individual's voice, or it can be used to authenticate or verify a speaker's identity. Speaker verification seeks to determine a 1:1 match where one speaker's voice is matched to one template whereas speaker identification seeks to determine a match from among N different acoustic signatures or acoustic templates.

In an example, a recognition system can include two phases: enrollment and verification. During enrollment, for example, a media object such as an image, video, or audio sample, can be received and recorded. Image characteristics or voice features (e.g., frequency components or spectral information) can be extracted to form a reference, such as a reference image, voice print, template, or model. In the verification phase for audio or image information, a candidate media (e.g., image and/or audio) sample can be compared against a reference. For identification systems, the candidate media can be compared against multiple reference media to determine a best match. For authentication systems, the candidate media can be compared against a particular reference, such as for a particular person or authorized (or unauthorized) user.

In an example, the audio processor circuit 112 can authenticate a user and can check for permission to put the device in one or more different modes, such as including a monitoring mode. In the monitoring mode, the first system 100 can use information from the audio sensor 110 or the image sensor 114 to detect objects in the environment, capture motion information about the detected objects, track and classify objects in the environment, and detect and recognize sounds. In response, the processor circuit 118 can use a rules-based framework to determine whether to sound an alarm or alert a particular system operator or user. In an example, the rules-based framework includes using a combination of data from one or more auxiliary sensors that are configured to transmit information to the first system 100.

In an example, the image sensor 114 can be configured to have embedded triggers for motion detection, human detection, or human or other object recognition. That is, a module or function of the image sensor 114 can be or can include image analysis to determine if motion exists in the environment (e.g., by comparing changes in pixel information from a series of frames acquired by the image sensor 114), or can include image analysis to determine if a human form, or a particular human or other object, is present in the field of view of the image sensor 114. In response to motion or a positive identification or a human or other object, the image sensor 114 or the image processor circuit 116 can generate an event indication that can, among other things, cause video information corresponding to the event to be recorded or displayed to a user, such as a system administrator, such as for authentication or validation.

In an example, the image processor circuit 116 is configured to analyze images received by the image sensor 114 to determine whether a received image includes a recognized face (e.g., a face of an enrolled individual). If a face is detected or recognized, then the image processor circuit 116 can generate an event indication and report the event to a user, such as together with video or image information about the event. In an example, the image processor circuit 116 can be configured to trigger an event for storage and/or streaming, such as without performing face recognition. When a face is detected or recognized, the event information can be updated in a server to reflect this as part of the event, such as using metadata associated with the video or other data associated with the event. After the face is detected or recognized, the server can make available, or can communicate to a user, information about the event and/or about the detected face. In an example, the server can provide an alert to a system administrator such as using a push notification, email, SMS (Short messaging service), etc., such as whenever particular events are created or whether pre-defined rules are triggered.

In an example, the image processor circuit 116 includes a face recognition module, such as a software-implemented ML or DL module that is executed at one or more of the first edge device 102 or the remote server 104 or elsewhere, such as a remote user device (such as can be coupled to the network 108). In an example, a mobile or web application executed on the user device can be configured to capture a video or image and send the corresponding data to a face recognition engine for enrollment. As part of this enrollment process, the user can create an entity in the first system 100 by providing attributes of the person in the captured video or image, such as the person's name, relationship, group, or other information uniquely identifying the person. The user can manage and maintain the person details and trained images through the face recognition engine. Any image or video that is passed into the face recognition engine, such as from the image sensor 114, can be processed to determine whether a face is detected and whether it matches an enrolled person. If an enrolled face is detected, then the face recognition engine can return the attributes associated with that person, such as together with a time stamp, person name, confidence level or relatedness metric, bounding box location of the face, or a frame number. If a face is detected but not determined to be part of an enrolled list of users, then the face recognition engine can return an unknown face detected event, such as together with a time stamp, bounding box, location of the face, or the frame number of the face found in the video. Any or all of these attributes can be passed to a local or remote server for storage, retrieval, or further processing.

In an example, the first system 100 can include or use other sensors such as can be communicatively coupled with one or more components of the first system 100. Such a sensor can be configured to sense information about the environment in which it is deployed to detect deviations from a normal condition or to detect changes that exceed some specified threshold condition. In an example, a ML or DL system can be used to monitor sensor data to establish normal conditions over time. The sensors can include, for example, biologic or biometric sensors, a passive infrared (PIR) motion sensor, a thermostat, a fire or smoke alarm sensor, an access control device or card reader, a door or entryway sensor, a garage or gate sensor, an acoustic sensor, a smart speaker, or others. In an example, such sensors may not include an integrated or embedded audio sensor or image sensor. However, the present systems can be used to augment such edge devices. For example, a camera (e.g., the image sensor 114) and an image processor (e.g., the image processor circuit 116) can be added or communicatively coupled to an edge device sensor. The image sensor 114 can capture images or videos at or near the edge sensor. In an example, camera activity or image sensing or recording can be triggered or initiated in response to information detected in an image or by an alert or other indication from another sensor.

In an example, a PIR motion sensor can sense motion or activity. Upon positive identification of the motion or activity, the PIR sensor can send a signal to the audio sensor 110 or the image sensor 114 or other portion of the first edge device 102 to begin receiving or recording audio or images. The received information can be processed, such as inside the first edge device 102, to determine whether a particular enrolled person is present in or absent from the scene.

In an example, events, actions, environmental changes, or other information sensed from non-visual sensors can be received and processed. In an example, the sensor information can be aggregated at a monitoring device or security panel such as installed on premise or located remotely in the cloud, such as to trigger video recording or face capture. Some examples of non-visual triggers, events, actions, or environmental changes can include but are not limited to doorbell button pushes, door or gate open triggers, other external relay or contact triggers, smoke or fire alarm triggers, acoustic information or events, temperature triggers, and others. In an example, a notification generated for a system administrator can include information from or about the non-visual sensors, such as can be provided together with visual image or video information from a camera.

In an example, the first system 100 can be configured to receive a trigger event, such as indicated by a visual or non-visual sensor, and perform some responsive action. In an example, the responsive action can be selected to augment or enhance a face or voice recognition process. For example, in response to a trigger event, the first system 100 can cause lights to turn on in a designated monitored area. In an example, the lights can enhance image capture by the image sensor 114 and thus facilitate facial recognition processing or reporting to the user.

In an example, audio communication can be established between a monitored environment and another location, such as when a particular person is detected in the environment using the facial recognition functions of the first system 100. In an example, the other location can include a monitoring station. The audio communication can be used to communicate information to the particular person such as to provide a verbal warning, or to request a voice audio sample that can be used for authentication, or to establish a call between the particular person and an emergency responder (e.g., 911 operator) or call center personnel.

In an example, in response to a trigger event, audio communication can be established between the monitored environment and the user. In an example, the audio communication can be established when a face is detected but not recognized, such as can signify that a real person is detected in the monitored environment. In an example, the face detection can be based on a liveliness check to ensure that there is a real person in the scene. Information from the audio communication can be used to help determine whether the present individual is authorized or not.

In an example, an edge device-based facial recognition system can be configured to provide various information. For example, a result of a facial recognition algorithm can be that (i) one or more recognized or enrolled individuals are detected to be present in a scene, or (ii) one or more unrecognized or unenrolled individuals are detected to be present in the scene, or (iii) some individuals in the scene are recognized or enrolled and some are not, or (iv) some individuals are determined to be present in the scene but the first system 100 has a relatively low confidence that at least one of the individuals corresponds to a recognized or enrolled individual. Information about the recognized or enrolled individuals, such as names or other characteristics can be determined and stored, communicated to a user, or otherwise used.

In an example, a face recognition engine is configured to process one or more received images (or frames of video data) and execute various algorithms for detecting a presence of a human face, identifying features of the human face, and then providing an indication of whether the features correspond to an enrolled individual. In an example, the face recognition engine first processes each of one or multiple received images to identify one or more regions that are likely to include a human face or that include candidate faces or candidate facial features. Next, the face recognition engine can identify facial feature relationships and calculate an overall score, or value indicating a relatedness of reference information to candidate information, based on one or more scores associated with the features. The overall score can be a metric that indicates a confidence that a particular known or enrolled human or individual is identified in the scene, as opposed to another human or a non-human object. While performing facial recognition or audio signature recognition, the processor circuit can be configured to consider occlusion (e.g., by a face mask such as a surgical mask or dust mask or other particulate-filtering mask), illumination or other conditions.

In an example, the user device 126 such as can be associated with a system administrator or other security system user, can include a mobile or desktop application or web interface. A user can use the user device 126 to receive reports about one or more other components of the first system 100, such as including configuration information, enrollment information, or archived event information, or live image or video feed information. In an example, the interface can include or display a timeline of events including an indication of when one or more enrolled individuals were visible, such as on a specified date or date range.

In an example, the user device 126 can be used to establish two-way or one-way communication between the user and the environment that includes the first edge device 102. For example, a user can use the user device 126 to begin a conversation with an unknown person in the field of view of the image sensor 114, for example using cloud connectivity to initiate the communication between the mobile application of the user device 126 on one end and the image sensor 114 at the other end. In this example, video and/or audio information from the can be provided at the user device 126 substantially in real-time and audio and/or video information from the user device 126 can be played back using, for example, the speaker 120 or the display 122.

The example of the processor circuit 118 can comprise all or a portion of one or more of the other processor circuits discussed herein, such as the audio processor circuit 112, the image processor circuit 116, or one or more other processors or circuits, such as can be provided outside of the first edge device 102. In an example, the processor circuit 118 can include one or more processor(s) or processor cores. The one or more processor(s) can be implemented as one or more microprocessor circuits, microcomputers, microcontrollers, digital signal processor circuits, central processor circuits, logic circuitries, and/or any devices that manipulate data based on operational instructions. Among other capabilities, the one or more processor(s) are configured to fetch and execute computer-readable instructions stored in a memory, such as the local database 124, the remote database 106, or elsewhere. The memory can store one or more computer-readable instructions or routines, which can be fetched and executed to create or share the data units over a network service. The memory can comprise any non-transitory storage device including, for example, volatile memory such as RAM, or nonvolatile memory such as EPROM, flash memory, and the like.

The processor circuit 118 can comprise an interface(s). The interface(s) can comprise a variety of interfaces, for example, interfaces for data input and output devices, referred to as I/O devices, storage devices, and the like. The interface(s) can facilitate communication of the processor circuit 118 with various input devices and an output devices. The interface(s) can also provide a communication pathway for one or more components of the processor circuit 118. Examples of such components include, but are not limited to, various other processing circuits or engine(s) and data. The processing engine(s) can be implemented as a combination of hardware and programming (for example, programmable instructions) to implement one or more functionalities of the processing engine(s). In examples described herein, such combinations of hardware and programming can be implemented in different ways. For example, the programming for the processing engine(s) can be processor executable instructions stored on a non-transitory machine-readable storage medium and the hardware for the processing engine(s) can comprise a processing resource (for example, one or more processor circuits), to execute such instructions. In some examples, the machine-readable storage medium can store instructions that, when executed by the processing resource, implement the processing engine(s). In such examples, the processor circuit 118 can comprise the machine-readable storage medium storing the instructions and the processing resource to execute the instructions, or the machine-readable storage medium can be separate but accessible to processor circuit 118 and the processing resource. In other examples, the processing engine(s) can be implemented by other electronic circuitry.

The data can comprise data that is stored or generated as a result of functions implemented by any of the components of the processing engine(s). In an example, the processing engine(s) can comprise an input receive engine, an audio processing engine (e.g., comprising the audio processor circuit 112), a video processing engine (e.g., comprising the image processor circuit 116), an event identifier engine, a notification engine, and other engines.

In an example, the input receive engine receives input data from an input device, such as from the audio sensor 110 or the image sensor 114. The input data can include, among other things, a sequence of images of a video stream and audio signals, such as audio signals that can be associated with video input data, such as for purposes of monitoring and surveillance. In an example, the audio processing engine and the video processing engine can process the audio signals and the video stream respectively. In an example, the video processing engine can extract feature data from the input data to detect one or more objects in the respective images of the video stream.

In an example, the audio processing engine can process audio commands received or detected by the audio sensor 110. In an example, the audio commands are selected to cause the first system 100 to operate in an assistant mode or a monitoring mode or an authentication mode. In an assistant mode, the first system 100 can be configured to perform tasks or services for a user such as by using natural language processing (NLP) to match a user voice input to executable commands and can provide an audible response to the user through an output device such as the speaker 120, or provide some other system response. The audio processing engine can continually learn using artificial intelligence techniques including machine learning and deep learning.

In an example, an event identifier engine of the processor circuit 118 can be used to determine an event by comparing attributes of one or more visually detected objects or acoustically detected audio events with pre-defined rules, such that when an event is determined, and a notification can be sent to the user using a notification communication engine (e.g., using the user device 126). For example, a rule can be defined for a particular object that if the particular object is not detected in an image, then the particular object can be termed as a "missing object" and a notification can be sent to a user using the notification engine. In an example, the audio processor circuit 112, the image processor circuit 116, and the event identifier engine can be used together to determine, e.g., present or missing objects, intrusion by an unidentified person, or other events that can trigger a notification to a user.

In an example, the notification engine can be configured to notify various users based on a set of rules defined for each respective user. For example, if the first system 100 is used by several users, separate rules can be defined for each user so that the notifications can be sent to designated ones of the users only.

In an example, the first system 100 can notify a user about detected unusual or abnormal visual events. For example, the first system 100 can detect an intrusion into a designated zone or can determine if an individual or vehicle or other object is loitering or remaining in a particular zone for greater than a specified threshold time duration. In an example, the first system 100 is configured to determine names or other information about detected individuals, if the first system 100 is pre-configured with such information, and/or to label individuals or objects as unknown. In an example, the first system 100 can detect and notify a user about regular events, for example, to alert a user when a package or box or e-commerce delivery or mail is detected in a particular location in a field of view.

Figure 2:
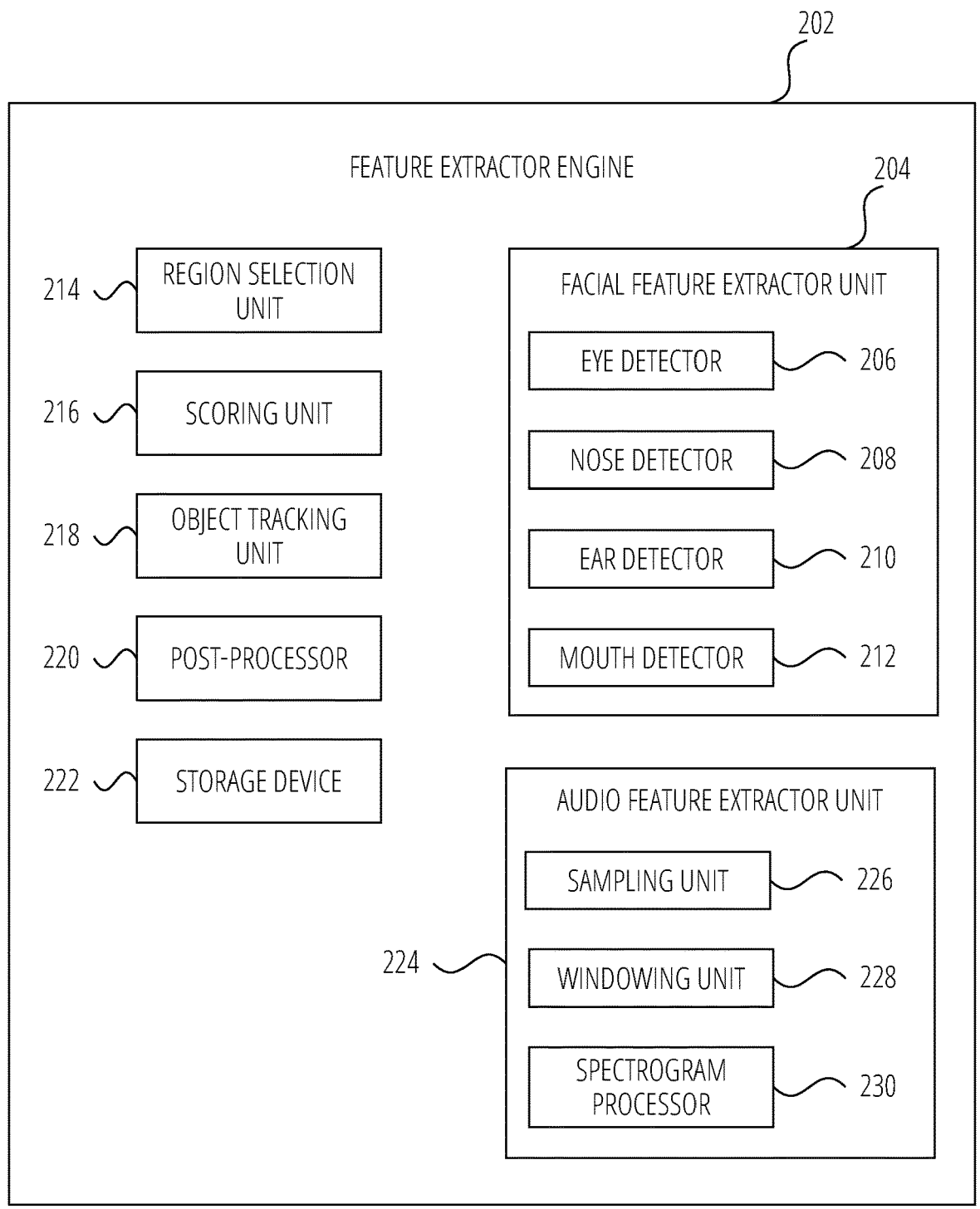
FIG. 2 illustrates generally an example of a feature extractor for an artificial intelligence-enabled analyzer.

FIG. 2 illustrates generally an example of a feature extractor engine 202. The feature extractor engine 202 can be implemented in whole or in part in one or more of the first edge device 102, the remote server 104, the user device 126, or elsewhere. That is, various functional aspects of the feature extractor engine 202 can be performed at or in one of the devices, or can be distributed across multiple devices. In an example, the feature extractor engine 202 can comprise a portion of an artificial intelligence processing system, such as can include one or more ML or DL algorithms, classifiers or neural networks. The feature extractor engine 202 can process media information, such as image or audio information from or about various objects, and identify various media features or characteristics that can be analyzed.

In the example of FIG. 2, the feature extractor engine 202 includes a region selection unit 214, a facial feature extractor unit 204, an audio feature extractor unit 224, a scoring unit 216, an object tracking unit 218, a post-processor 220, and a storage device 222. The facial feature extractor unit 204 can further include one or more specialized extractor modules or functional units to process image information. For example, the facial feature extractor unit 204 can include an eye detector 206, a nose detector 208, an ear detector 210, a mouth detector 212, or other module configured to detect various features or aspects of a human face that can be used in a recognition algorithm.

The audio feature extractor unit 224 can further include one or more specialized audio feature extractor modules or functional units to process audio information. For example, the audio feature extractor unit 224 can include a sampling unit 226 such as can be configured to receive an audio sample and parse it into overlapping or non-overlapping audio frames. The audio feature extractor unit 224 can include a windowing unit 228 that is configured to apply a windowing function on the audio frames. In an example, the windowing function includes a Hamming windowing function or a Hann windowing function. The windowing function can be performed using the audio processor circuit 112 or another processor circuit.

In an example, a windowing function can be configured to pass frequency and amplitude information from the audio frames that is most likely to include an abnormal event of interest. For example, if the first system 100 is configured to perform authentication using a voice signature, then the windowing function can be configured to pass primarily middle frequency audio information corresponding to speech. However, in an example, using ML-based processing can be configured to automatically learn about frequency or other content of interest and accordingly an ML-based technique can reduce or eliminate a need for frequency-based windowing. In an example, the audio feature extractor unit 224 can be configured to determine a power spectrum of one or more of the audio frames. The power spectrum can be determined using a fast Fourier transform (FFT) or other signal transform technique that can provide information about a distribution, such as a relative or absolute distribution, of sound energy at or centered at different frequencies. The audio feature extractor unit 224 can further include a spectrogram processor 230 that can operate on the determined power spectrum. The spectrogram processor 230 can be configured to generate an audio signal spectrogram such as can include a representation of a spectrum or number of different frequencies or frequency bins that include information from the audio frames. The spectrogram information can be used as an input to one or more ML or DL classifiers.

In an example, the feature extractor engine 202 includes an input unit to receive a media, such as frame-based image data or audio information. In an example, the input unit receives image information from one or more systems including the image sensor 114, the audio sensor 110, or elsewhere. The input unit can receive a video stream instead of an image and the video stream can be divided into a sequence of frames. In an example, the feature extractor engine 202 is configured to remove noise from a received media frame before further processing. The frames can be received by the feature extractor engine 202 automatically at pre-defined intervals or irregularly. For example, the feature extractor engine 202 can receive frames on demand, such as when an identification trigger is sent by, for example, a motion detector. In an example, frames can be received in response to a user or system request.

In an example, images are captured in real-time by the image sensor 114, and the images can be stored. The images received can be in any suitable format for data analysis. The images can include objects such as human bodies, vehicles, trees, animals, buildings, any articles and so forth. Further, the images can include one or more regions that include non-human objects. Generally, regions that include or that may include a human face or facial feature can be referred to herein as a candidate region of an image. A frame or image can have zero, one, or multiple candidate regions. In an example, a candidate region comprises all or a portion of a frame. That is, the candidate region can correspond to an entire field of view or less than an entire field of view.

In an example, the region selection unit 214 is configured to select one or more candidate regions from the one or more of regions in a frame based on a pre-defined threshold. The pre-defined threshold can indicate a probability of finding a human face, or a portion or part of a human face, in a region of the frame. In an example, candidate regions can include bounding boxes that are generated using machine learning-based detector algorithms. These algorithms can run efficiently, quickly, and generate candidate regions with false positives that can generally be eliminated through further or more intensive processing.

In an example, the region selection unit 214 executes a region selection algorithm to select one or more candidate regions. The region selection algorithm can be biased to provide a low number of false negatives, meaning if a region includes a human face or feature, there is very low probability that the region will be rejected. In an example, the region selection algorithm can be biased to provide a high number of false positives, meaning if a region does not have a human face or feature, then the region can be selected. Various algorithms can be used for candidate region selection such as motion-based algorithms, simple HOG and SVM-based algorithms, and foreground pixels detection-based algorithms. After the one or more candidate regions are selected, then the selected regions can be provided to the facial feature extractor unit 204 for further processing.

In an example, the facial feature extractor unit 204 is configured to detect a human face in a candidate region of the one or more candidate regions based on various constraints, such as can include one or more sets of pair-wise constraints. The facial feature extractor unit 204 can perform parts-based detection of the human face such as to identify facial features such as eyes, nose, ears, mouth, hair, or other attributes of a face or head region. In an example, the facial feature extractor unit 204 includes a set of feature detectors for detecting respective parts of a head or face. For example, the facial feature extractor unit 204 includes the eye detector 206, the nose detector 208, the ear detector 210, or the mouth detector 212. The eye detector 206 can be configured to detect locations or features of one or more eyes (e.g., size, placement, color, pupillary distance, etc.), the nose detector 208 is configured to detect size, placement, or other features of a nose, and so on. In an example, the facial feature extractor unit 204 can detect head-worn objects such as face masks, and can optionally detect or extract features from such objects.

In an example, the feature extractor engine 202 and/or the facial feature extractor unit 204 includes or uses Convolutional Neural Networks (CNNs) to process media data (e.g., comprising image information and/or audio information) and provide an indication or classification of the information in the media as, for example, comprising a face or being a face of a particular known or enrolled individual, or comprising an audio signature or voice of a particular known or enrolled individual. In an example, a neural network used herein for face detection or analysis can use ResNet or DenseNet architectures, or others. The network can be configured to incorporate or use motion information, such as by analyzing information from multiple image frames over time, to provide a result with information about a presence or absence of a human face in a frame. In an example, the network can be configured to use angle or depth information about a candidate object in its determination or classification algorithms.

The neural networks discussed herein and the models employed in such networks can be trained using various data sources. For example, specific training data that corresponds to an end application or end user can be used to train the model employed by the network. The models can be specific to different use cases or environments or can be more general. In an example, a semi-supervised (semi-manual) process can be used to import learning data.

The neural networks discussed herein can be tuned to maximize power efficiency, such as using fixed-point calculations using weighted or output-quantized nodes. Generally, a network library footprint can be about 1 MB or less of data, however larger library files can be used when more resources (power, processing time) are available. Memory buffers used to perform the neural network-based analysis can be used and reused, that is, the buffers can be swapped throughout execution and are allocated only on demand. In an example, auxiliary hardware or accelerators can be used, such as to perform specific tasks like CV functions, matrix multiplication, CNN execution, and more.

In an example, the facial feature extractor unit 204 detects a first facial feature at a first location in a candidate region using a first facial feature detector of the set of facial feature detectors. The first facial feature can be considered a root of a face, for example, eyes of a face. The facial feature extractor unit 204 further detects a second facial feature at a second location in the candidate region using a second feature detector of the set of facial feature detectors. The second body part detector is selected from the set of facial detectors, and can be based on a pair-wise constraint. The pair-wise constraint can be determined based on a relative location of the second location with respect to the first location.

In an example, the facial feature extractor unit 204 implements or uses fewer than all of the multiple available detectors, however, a decision of whether to apply one or more of the various available detectors can be condition-based. For example, the eye detector 206 can be applied first and if eyes are detected, such as eyes meeting a particular threshold condition, then other ones of the feature detectors can be applied in appropriate regions, or portions of a frame, relative to the detected eyes. The condition-based implementation helps reduce a number of times the detectors are applied and can reduce processing time and power consumption. Further, a conditionally-applied body parts-based network of classifiers helps reduce a size of the network and provides better performance as compared to a full face or head-based classification network. Following identification of one or more facial features, information about the detected one or more body parts can be provided to the scoring unit 216 for further processing.

In an example, the scoring unit 216 can be configured to compute a score for a candidate region based on at least one of a first score and a second score. The first score corresponds to a score of the first facial feature and the second score corresponds to a score of the second facial feature. The first score can be determined based on the detection of the first facial feature at the first location and the second score can be determined based on the detection of the second facial feature at the second location. Based on the first score and the second score, an overall score can be computed for the detected face by the scoring unit 216. In an example, the overall score can be a summation of the first score and the second score. In another example, the overall score can be a weighted summation of the first score and the second score. In an example, the facial feature extractor unit 204 can further implement one or more other facial feature or body part detectors, such as a torso detector or shoulder detector, until a complete or entire human upper body is detected. Based on the detected body parts, an overall score can be computed.

In an example, the object tracking unit 218 can be configured to track a head, face, body, or candidate region, across multiple frames. The tracking can be performed using techniques such as a MeanShift technique, an Optical Flow technique, a bounding box estimation technique, or other technique. In an example, a detected face can be tracked using the information contained in the current frame and one or more other adjacent (e.g., preceding or subsequent) frames. An object association or correspondence can be determined or provided for the detected objects in the different frames. In an example, a bounding box estimation process is executed, and the bounding box (or other shape containing the object) of an object in a current frame is compared with a bounding box in a previous frame(s) and a correspondence between the objects and/or bounding boxes to establish a cost function. The bounding box techniques can represent region and location information for an entire body or less than an entire body.

In an example, feature or model-based tracking can be used. According to this example, a pair of objects or features that includes a minimum value in a cost function can be selected by the object tracking unit 218. A bounding box of each tracked object can be predicted based on maximizing a metric in a local region. The prediction can be made using techniques such as, but not limited to, optical flow, mean shift, and/or dense-sampling search, and can be based on features such as HOG color, Haar features, and the like.

In an example, when object or feature tracking processing is complete, the object tracking unit 218 communicates with the post-processor 220 for further steps. The post-processor 220 can be configured to validate a detected face in the candidate region. The face can be validated based on at least one of a depth, a height and an aspect ratio of the face. In another example, the validation can be performed based on generic features such as color, HoG, SIFT, Haar, LBP, and the like. In an example, the validation can be performed using a region in a particular frame, using respective regions in multiple frames, or using full-frame analysis.

In an example, the storage device 222 can include a training database including pre-loaded or known media such as including voice fingerprints or human face images for comparison to a received image (e.g., image information received using the image sensor 114) during a detection process. The training database can include images of human faces in different positions and can include images of human faces having different sizes, shapes, genders, ages, hairstyles, clothing, facial adornments, and so on. In an example, the images can be positive image clips for positive identification of objects as human faces or can include negative image clips for positive identification of objects or non-human bodies.

In an example, the feature extractor engine 202 and/or components thereof can be provided in the form of hardware components or software entities or modules that can be implemented using a generic or purpose-built processor. In an example, the feature extractor engine 202 can be included in hardware or firmware of a camera, such as the image sensor 114, used to receive the image data, or can be included in a local or remote processing system. In an example, the feature extractor engine 202 can be a part of at least one of a mobile phone, a computer, a server, or a combination thereof.

Figure 4:
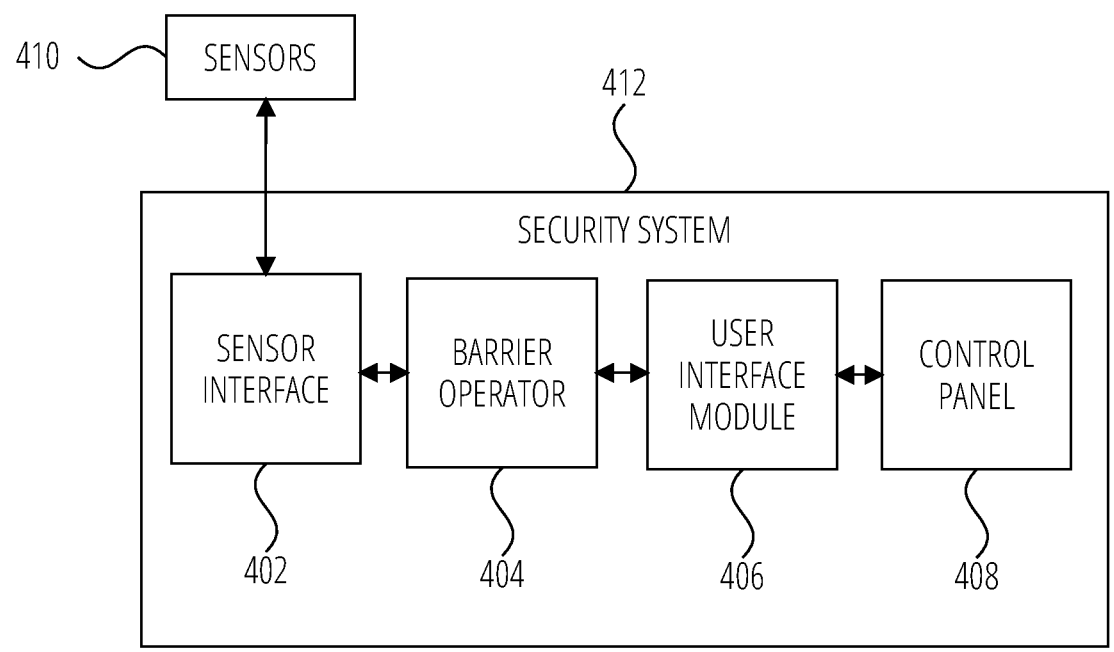
FIG. 4 illustrates components of a security system in accordance with an example.

Various algorithms, components, and processes for implementing human detection are discussed in U.S. Patent Application Publication No. 2017/0213081 ("the '081 publication"), titled "Methods and systems for automatically and accurately detecting human bodies in videos and/or images", which is hereby incorporated herein by reference in its entirety. Any one or more of the different algorithms, components, and processes in the '081 publication can similarly be applied in the context of the present application for the same or similar purpose of human identification in an image. For example, the '081 publication discusses using a Directional Weighted Gradient Histogram (DWGH) for detecting a human body in an image. The DWGH scheme can be used to provide better discrimination between positive and negative images. The '081 publication discusses using Latent Support Vector Machines (SVM) variables to improve detection accuracy. The '081 publication discusses enhancing processing speed and reducing false positives by using regions of detected motion and object tracking across frames. In FIG. 4, the '081 publication illustrates an exemplary method flowchart for detecting a body in an image based on a machine learning model including using deformable parts-based models for detecting human bodies, such as where one or more features are extracted for each part and are assembled to form descriptors based on pair-wise constraints. One or more of these features or aspects described in the '081 publication can be extended or applied to facial recognition.

Referring again to FIG. 2, the feature extractor engine 202 can be implemented in whole or in part at or in hardware or software at or adjacent to a camera, such as in the first edge device 102 or elsewhere in the first system 100. In an example, implementation at the first edge device 102 can be referred to as edge processing or edge-based processing. In an example, edge processing at a camera device can be performed using machine learning models that are trained to work with an image in a YUV color space. In an example, edge processing can be performed using machine learning models that are trained to work exclusively on one element of a color space, such as using Y information only from a YUV color space. That is, in an example, color or chrominance information can be disregarded and brightness or luminance information can be used for image recognition processing. In an example, with less than all of YUV information being used by a processor, higher resolution analysis can be performed in a shorter amount of time or using fewer cycles than if all of the YUV information is used together.

In an example, the feature extractor engine 202 includes a deep learning-based engine with anti-spoofing features. For example, the feature extractor engine 202 can be configured to discriminate camera images of a person or people in an environment from a photograph presented to the camera where the photograph includes imagery of the same person or people. Such anti-spoofing can be critical for home or other security deployments such that an intruder cannot use a picture, e.g., of a homeowner, to enter monitored areas. Anti-spoofing processing by the feature extractor engine 202 also allows for conventional, single lens 2D cameras to check for a real person being present.

Figure 3:
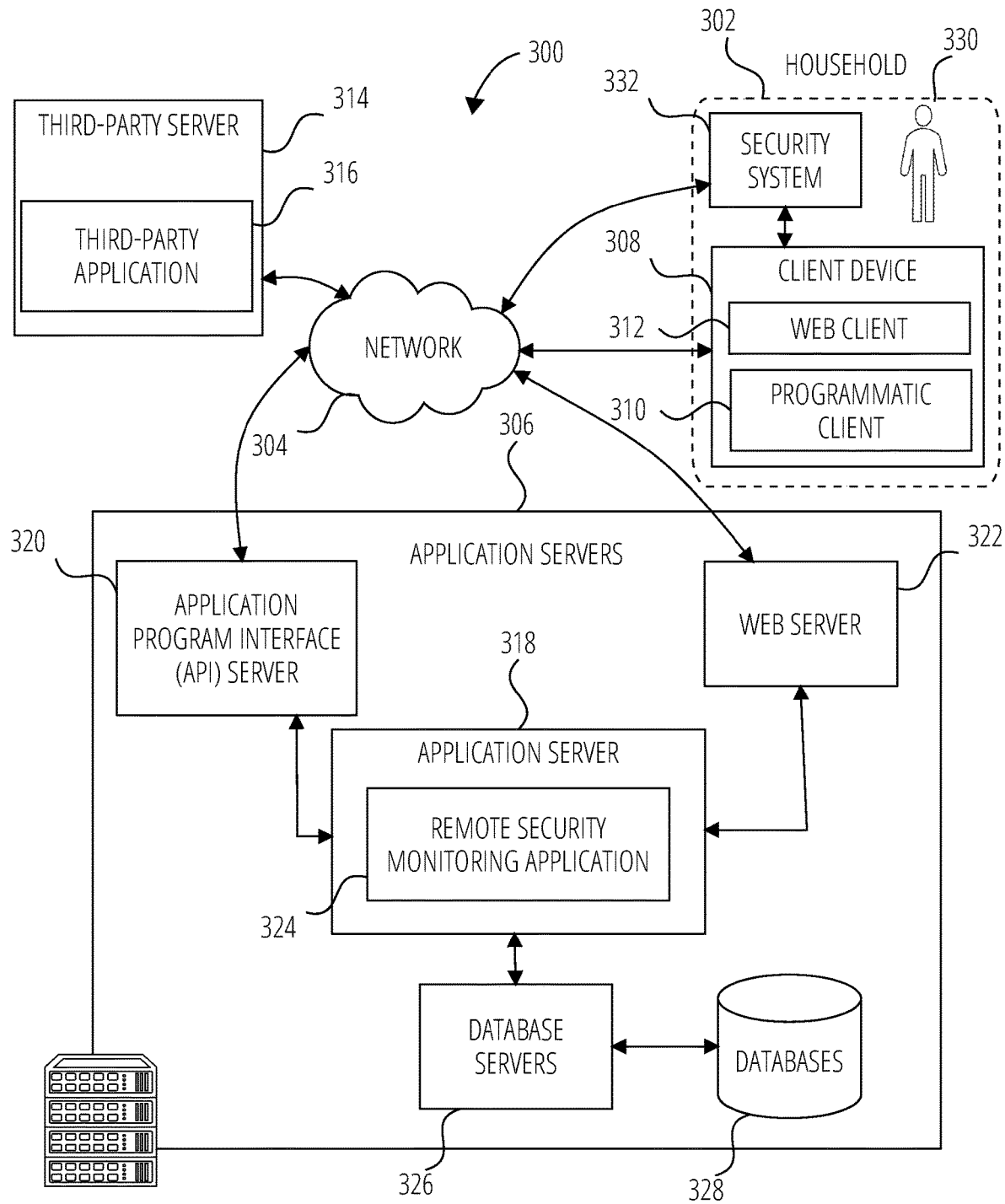
FIG. 3 is a diagrammatic representation of a networked environment in which the present disclosure may be deployed, in accordance with some examples.

FIG. 3 is a diagrammatic representation of an environment 300 in which some example embodiments of the present disclosure may be implemented or deployed. In the example, one or more application servers 306 provide server-side functionality via a network 304 to a networked user device, such as in the form of a security system 332 and a client device 308 of the user 330. In an example, the client device 308 comprises an example of the user device 126 of the first system 100, and the user 330 can comprise an authorized user or system administrator. The security system 332 can include a control panel (not shown) connected to sensors in a household 302 of the user 330. A web client 312 (e.g., a browser) and a programmatic client 310 (e.g., an "app") are hosted and execute on the client device 308. The client device 308 can communicate with the security system 332 via the network 304 or via other wireless or wired means with security system 332.

An Application Program Interface (API) server 320 and a web server 322 can provide respective programmatic and web interfaces to application servers 306. A specific application server 318 hosts a remote security monitoring application 324 that operates with the security system 332. In one example, the remote security monitoring application 324 receives an alert from a sensor of the security system 332, determines whether the alert corresponds to a known individual based on media information from the sensor, and communicates the alert to a control panel, to an access control device, a mobile device or elsewhere.

The web client 312 communicates with the remote security monitoring application 324 via the web interface supported by the web server 322. Similarly, the programmatic client 310 communicates with the remote security monitoring application 324 via the programmatic interface provided by the Application Program Interface (API) server 320. The third-party application 316 may, for example, be a topology application that determines the topology of an environment such as a factory, building, residence, apartment complex, or neighborhood. The application server 318 is shown to be communicatively coupled to database servers 326 that facilitates access to an information storage repository or databases 328. In an example embodiment, the databases 328 includes storage devices that store information to be published and/or processed by the remote security monitoring application 324.

Additionally, a third-party application 316 executing on a third-party server 314, is shown as having programmatic access to the application server 318 via the programmatic interface provided by the Application Program Interface (API) server 320. For example, the third-party application 316, using information retrieved from the application server 318, may support one or more features or functions on a website hosted by the third party. In one example, the third-party server 314 communicates with another remote controlled device (e.g., smart door lock) located at the household 302. The third-party server 314 provides the door lock status to the security system 332, the client device 308, or the application server 318. In another example, the security system 332, the client device 308, and the application server 318 can control the door lock via the third-party application 316.

FIG. 4 illustrates components of a security system in accordance with one example embodiment. The security system 412 can comprise an example of the first edge device 102. In an example, the security system 412 can include a sensor interface 402, a barrier operator 404, a user interface module 406, and a control panel 408. The security system 412 communicates, via the sensor interface 402, with one or more sensors 410 disposed in a physical facility (e.g., a home, a building, a factory, a campus). For example, the sensor interface 402 identifies the sensors 410 and accesses sensor data from the sensors 410. In one example, the sensors 410 are registered with the security system 412. In an example, the sensors 410 can include the audio sensor 110 or the image sensor 114 or other biometric or physiologic sensor that is configured for use in authentication or system enrollment procedures.

The barrier operator 404 can be configured to communicate with or control one or more barriers or access control systems in an environment. For example, the barrier operator 404 can be configured to lock or unlock gates or doors, open or close overhead doors or garage doors, or otherwise help control access to a protected environment. In an example, the barrier operator 404 can grant or deny access to an environment based on instructions from the processor circuit 118 in the first edge device 102, such as can be based on media that is analyzed using artificial intelligence to determine whether an authorized individual requested access or is present at a particular barrier location.

The user interface module 406 generates a user interface for the security system 412. In an example, the user interface module 406 can include or use the speaker 120 or the display 122 of the first edge device 102. The control panel 408, such as can include the user interface module 406, can further include a user input that enables a user, such as the user 330, to control behavior or features of the security system 412. In an example, the control panel 408 can be a virtual control panel that is accessed via a client, such as the user device 126, or other computing device registered with the security system 412.

Figure 5:
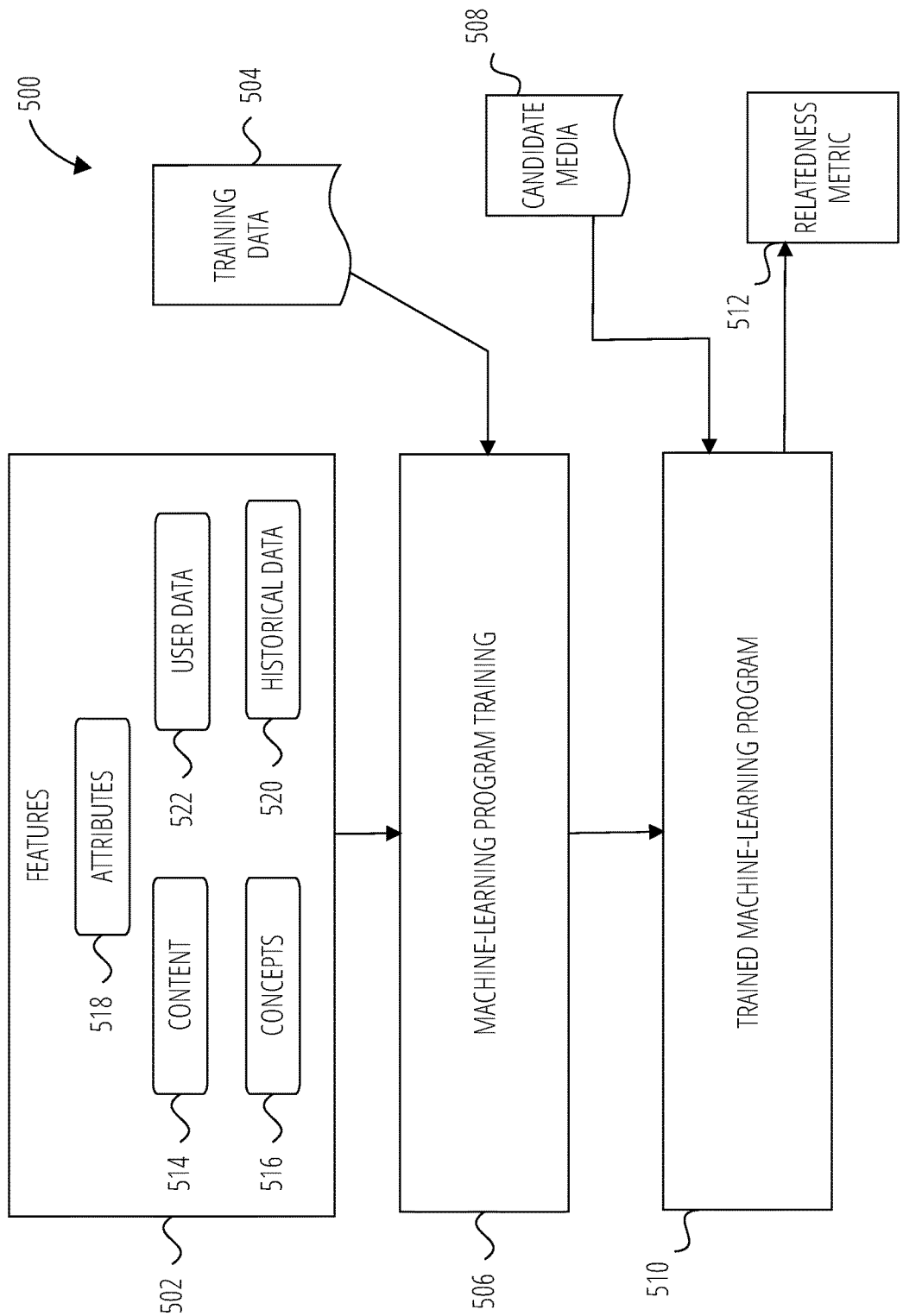
FIG. 5 illustrates generally an example of training and use of a machine-learning program.

FIG. 5 illustrates training and use of a machine-learning system 500, according to some example embodiments. In some example embodiments, machine-learning (ML) programs, also referred to as machine-learning algorithms, can be used to perform operations for user recognition or authentication. In an example, the machine-learning system 500 can comprise a portion of the first system 100, or can be implemented using the first edge device 102, the remote server 104, or the user device 126. In the example of FIG. 5, the machine-learning system 500 includes machine-learning program training 506, such as can use training data 504 or various features 502, to provide a trained machine-learning program 510. The trained machine-learning program 510 can receive candidate media 508 and, in response, provide a relatedness metric 512 or value indicating whether an individual identified in the candidate media 508 can be authenticated.

In machine learning, computers or processors can be programmed to learn or acquire new information, from or with which later decisions can be made, without being explicitly programmed. Machine learning explores the study and construction of algorithms that can learn from existing data and make predictions about new data. Such machine-learning can operate by building a model from example training data 504 or reference information in order to make data-driven predictions or decisions expressed as outputs or assessments (e.g., as a relatedness metric 512). Although example embodiments are presented with respect to a few machine-learning tools, the principles presented herein may be applied to other machine-learning tools or algorithms. Various algorithms can be used, for example, Logistic Regression (LR), Naive-Bayes, Random Forest (RF), neural networks (NN), matrix factorization, and Support Vector Machines (SVM) can be used for classification, or recognition, such as to determine a relatedness between different media samples.

Two common types of problems in machine learning are classification problems and regression problems. Classification problems, also referred to as categorization problems, aim at classifying items into one of several category values (for example, is a particular object in an image a person or an inanimate object). Regression algorithms aim at quantifying some items (for example, by providing a value that is a real number). In some examples, classification and regression can be used together. In some examples, machine learning can be used to determine a relatedness metric that places a value on how related two or more media samples are. In an example, various decisions can be made by a system based on a value of the relatedness metric, for example, access control decisions.

The machine-learning algorithms use features 502, such as can be determined or extracted using the feature extractor engine 202, for analyzing data to generate a relatedness metric 512. In an example, a feature can include a measurable or identifiable characteristic or property of all or a portion of a media sample. Each of multiple features 502 can be an individual measurable property of a phenomenon being observed. The concept of a feature is related to that of an explanatory variable used in statistical techniques such as linear regression. Choosing informative, discriminating, and independent features can be important for the effective operation of an ML algorithm such as for pattern recognition, classification, or regression. Features can be of different types, such as numeric features, strings, and graphs. In an example, the features 502 can be different types and can include one or more of content 514 (e.g., objects or people present in an image; words spoken by an individual), concepts 516, attributes 518 (e.g., features extracted from or used to characterize a particular face image or audio sample), historical data 520 and/or user data 522, for example.

A machine-learning algorithm can use the training data 504 to find correlations among the identified features 502 that affect an outcome or assessment or analysis result, such as can include a relatedness metric 512. In some examples, the training data 504 includes labeled data, which is known data for one or more identified features 502 and one or more outcomes, such as detecting communication patterns, detecting the meaning of a message, generating a summary of a message, detecting action items in a message, detecting urgency in a message, detecting a relationship of a user to an enrolled individual, calculating score attributes, calculating message scores, etc. In an example, the training data 504 comprises enrollment data for one or multiple individuals associated with a security system. For example, the training data 504 can include face images or voice prints or biometric or physiologic signals that are identified with a particular individual and corresponding access levels for the individual. The access levels can include, for example, information about whether the individual is permitted to access particular locations that are protected by one or more barriers or alarms, such as where access can be controlled using the barrier operator 404.

With the training data 504 and the identified features 502, the machine-learning algorithm can be trained at block machine-learning program training 506. The machine-learning algorithm can be configured to appraise relationships or correlations between the various features 502 and the training data 504. A result of the training can be a trained machine-learning program 510. When the trained machine-learning program 510 is used to perform an assessment, candidate media 508 is provided as an input to the trained machine-learning program 510, and the trained machinelearning program 510 generates the relatedness metric 512 as output. In an example, the relatedness metric 512 includes a value (e.g., a numerical value or other indicator) that indicates whether a particular individual identified in the candidate media 508 can be authenticated or matched with a known individual.

Figure 6:
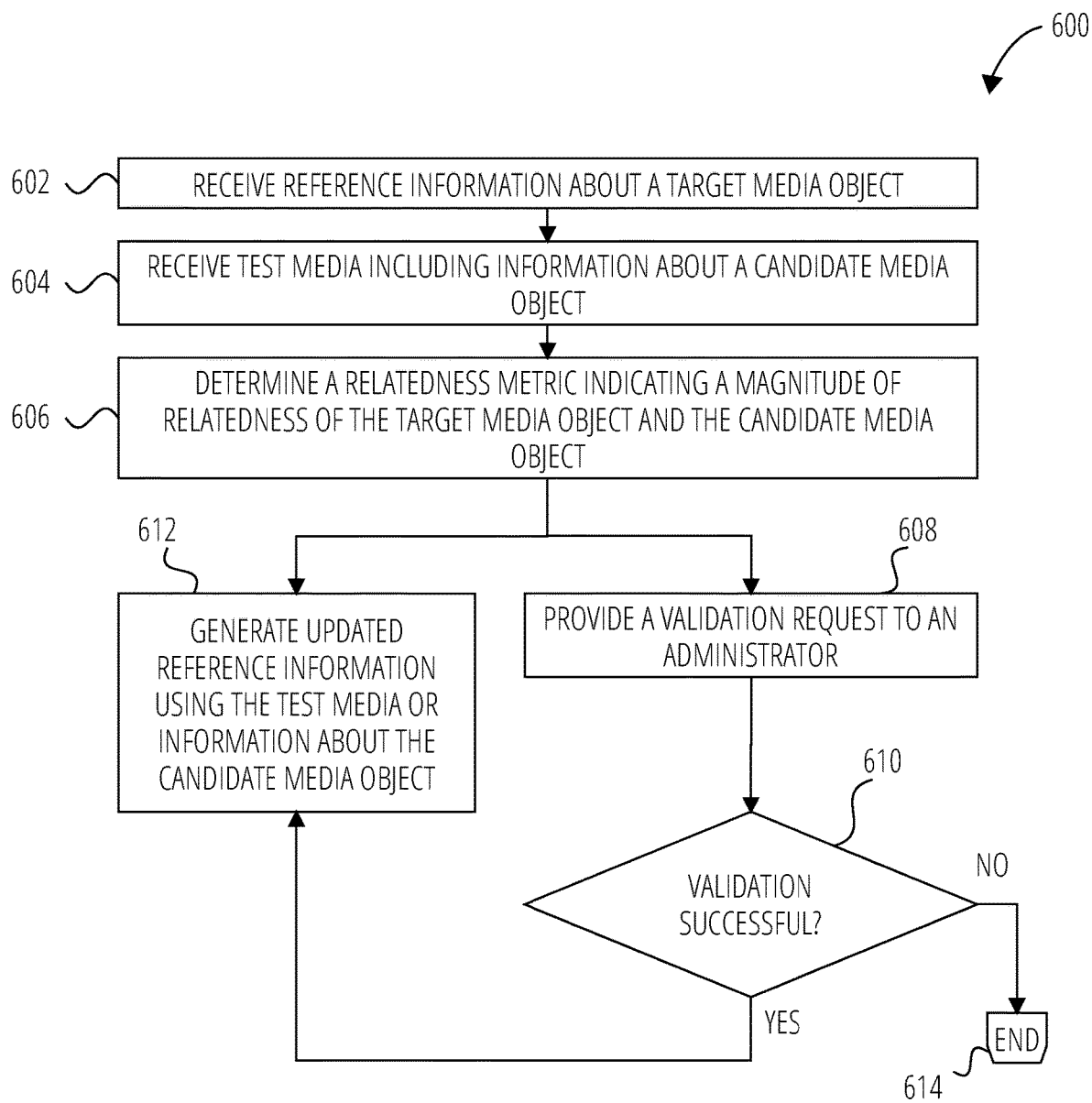
FIG. 6 illustrates generally an example of a first method that can include or use an artificial intelligence-enabled analyzer.

FIG. 6 illustrates generally an example of a first method 600 that can include conditionally updating reference information for an artificial intelligence-enabled authentication system. In an example, the machine-learning system 500, such as can be implemented using the first system 100 or one or more components thereof, can perform the first method 600. In an example, the first system 100 comprises the security system 412, and the first edge device 102 comprises an installed security system panel or security checkpoint device, and the first system 100 uses the processor circuit 118 to implement the machine-learning system 500 and perform image or audio authentication to control access to a protected environment.

Figure 7:
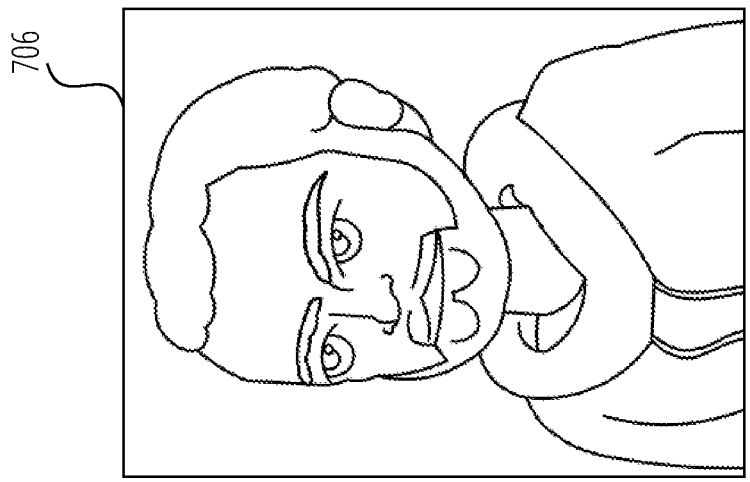
FIG. 7 illustrates generally examples of images that can comprise reference information or test information.
Figure 7:
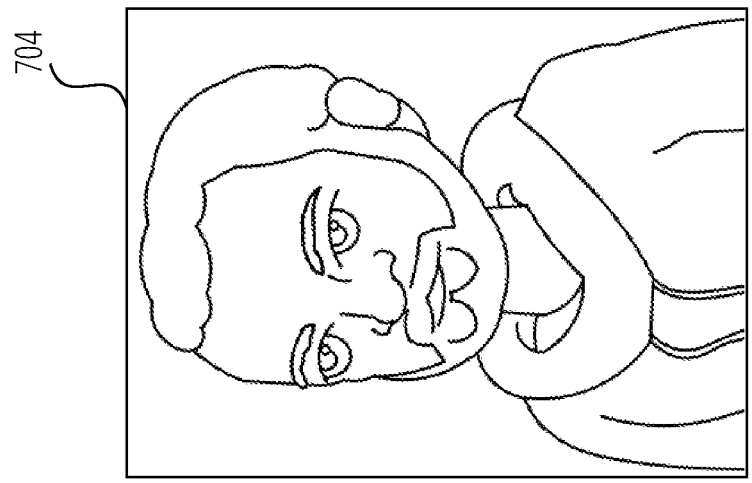
Figure 7:
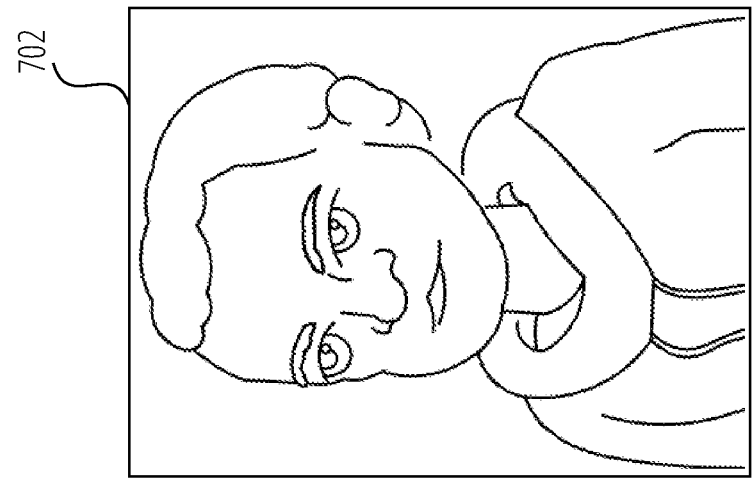

The example of FIG. 6 is discussed herein with reference to images in FIG. 7. FIG. 7 illustrates generally an example that includes a first image frame 702, a second image frame 704, and a third image frame 706. The image frames can be acquired by, for example, the image sensor 114, or other camera or input device that is configured to receive or process image information.

In the example of FIG. 7, the first image frame 702 is a reference image or reference media. That is, the first image frame 702 can include or represent a target media object, such as can include reference information about a person or object against which one or more candidate media objects can be compared, for example, using the machine-learning system 500. In an example, the target media object can be previously registered with or know by the machine-learning system 500. For example, the first image frame 702, such as representative of the target media object, can be provided to the machine-learning system 500 as training data 504 or as other reference or training information for use by the system.

The second image frame 704 includes an image of a first candidate, or first candidate media object. That is, the first candidate media object can include test media or test information that can include an image of a person. The third image frame 706 includes an image of a second candidate, or second candidate media object. The second candidate media object can include test media or test information that can include an image of a person. The machine-learning system 500 can be used to receive the image frames or information about the frames, such as feature information extracted (e.g., using the feature extractor engine 202) from the image frames. In response to the image frames, the machine-learning system 500 can provide a comparison result indicating a likelihood that the first or second candidate media object is the same object as the target media object in the reference image or first frame. In other words, the machine-learning system 500 can be configured to compare the second image frame 704 to the first image frame 702 to determine a likelihood that the face image represented in the second image frame 704 belongs to the same person as the face image represented in the first image frame 702 or reference image. Similarly, the machine-learning system 500 can be configured to compare the third image frame 706 to the first image frame 702 to determine a likelihood that the face image represented in the third image frame 706 belongs to the same person as the face represented in the first image frame 702 or reference image.

Returning to the example of FIG. 6, the first method 600 can begin at block 602 with receiving reference information about a target media object. In an example, block 602 can include receiving reference face information about a person (e.g., comprising the target media object), or can include receiving audio information, such as a voice password or voice sample, about a person (e.g., comprising the same target media object). For example, block 602 can include using the image sensor 114 to receive the first image frame 702 that includes an image of a face of a person. In an example, block 602 can include receiving the reference information from a database, such as the local database 124 of the first edge device 102, or the remote database 106 of the remote server 104, or from elsewhere.

At block 604, the first method 600 can include receiving test media, such as test image information or test audio information. The test media can include information about a candidate media object. In an example, block 604 can include receiving the test media using the image sensor 114, or using the audio sensor 110, or both. In an example, block 604 can include receiving the test media from elsewhere, such as via the network 108, or via a camera or microphone integrated with the user device 126, or using another external source. In an example, block 604 can include authenticating a device for communication with the first edge device 102 or the remote server 104, and the device can be selectively authorized to provide the candidate media object, such as depending on credentials of the device.

At block 606, the first method 600 can include determining a relatedness metric indicating a magnitude of relatedness of the target media object (e.g., received at block 602) and the candidate media object (e.g., received at block 604). In an example, block 606 can include or use the second method 800 from FIG. 8.

In an example, block 606 can include using, or configuring the machine-learning system 500 to use, the information about the target media object and the information about the candidate media object to provide an indication of relatedness between the objects. The indication of relatedness, or the relatedness metric, can include a numerical value or other indicator of relative similarity or difference between the objects such as can be based on a feature comparison. In an example, the relatedness metric provides a measure or level of confidence that the candidate media object (e.g., comprising an image or audio sample) is or represents the same entity as the target media object (e.g., comprising a different image or audio sample). In an example, the media objects to be compared at block 606 can include image or audio information about or from a person, or can include image or audio information about an object such as a vehicle. For example, reference and candidate audio information about a vehicle engine, or vehicle door opening or closing, can be used to determine a relatedness metric such as can indicate a confidence level that a candidate vehicle sound corresponds to a reference vehicle sound and therefore is likely to be the same vehicle in the vicinity of, e.g., the audio sensor 110.

In an example, the information about the relatedness metric can be used to control access to a protected environment. For example, if the relatedness metric indicates a high level of confidence (e.g., the metric meets or exceeds a specified threshold confidence, such as can be represented numerically) that the candidate media object represents the same individual or entity as the target media object, and the target media object is associated with permission to access the protected environment, then access can be granted. If, however, the relatedness metric indicates a low level of confidence that the candidate media object represents the same individual or entity as the target media object, or if the target media object is associated without permission to access the protected environment, then access can be prevented or inhibited.

In an example, the first image frame 702 comprises information about the target media object and the second image frame 704 comprises information about the candidate media object. In this example, the system can determine a relatedness of the candidate and target objects is relatively high because, for example, the faces represented in the image frames have substantially the same eye shape or interpupillary distance, or have substantially the same ear shape or mouth shape, or other can have other similar features. That is, the system can be configured to determine a relatedness that is relatively high even though the face in the second image frame 704 has a beard while the face in the first image frame 702 does not.

In another example, the first image frame 702 comprises information about the target media object and the third image frame 706 comprises information about the candidate media object. In this example, the system can determine a relatedness of the candidate and target objects is relatively low because, for example, the faces represented in the image frames differ in one or more material respects. For example, the faces can have different mouth shapes, or can have different facial hair features that cannot be attributed to the same individual (e.g., different eyebrow shape or location). Accordingly, the system can be configured to determine a relatedness that is relatively low.

Using the determined relatedness metric information, the first method 600 can continue from block 606 at block 608. At block 608, the first method 600 can include providing a validation request to a system administrator or system operator. For example, if the relatedness metric determined at block 606 indicates less than a specified threshold level of relatedness, then the system can request or require validation from a system administrator. In an example, requesting validation can include providing information about the candidate media object to the system administrator. In an example, the request can further include information about the candidate media object. For example, the user device 126 can be configured to receive image information about the target media object and the candidate media object such that the image information can be displayed side-by-side, and the system administrator can be prompted to make a decision about whether to grant or deny access. If, at decision block 610, the validation is successful, then the first method 600 can continue to block 612 by optionally updating reference information or training data that is used by the machine-learning system 500. By updating the reference information to include the candidate media object as a new or additional target media object, for example, the machine-learning system 500 can evolve over time to ensure that authentication proceeds seamlessly and unobtrusively, such as without requiring re-enrollment or different setup procedures when reference characteristics or features change. In an example, the system administrator can be prompted to determine whether to use the candidate media object as a new target media object or to disregard it, or can be prompted to determine whether to replace the original target media object with the candidate media object and expunge the original test media object. If, at decision block 610, the validation is not successful, then the first method 600 can terminate at block 614. If the first method 600 terminates at block 614, then access can be denied based on the candidate media object.

In an example, the first method 600 can include determining the relatedness metric at block 606 and then proceeding to block 612 without requesting or requiring administrator validation or input. For example, if the relatedness metric as-determined at block 606 indicates a sufficiently high confidence that the candidate media object represents the same entity as the target media object, then the first method 600 can include automatically generating the updated reference information at block 612. In an example, different threshold confidence levels can be established, or learned by the system over time, to determine when to use or require validation at block 608 or when to automatically generate the updated reference information based on a candidate media object at block 612. The learned threshold confidence level can be established based on validation patterns detected by the system.

In an example, the test media can include a face image of an individual wearing a partial face mask, such as a cloth or fiber mask, or surgical mask such as an N95 mask, that covers a nose or mouth portion of a face. The system can be configured to determine the relatedness metric at block 606 based on eye features, or ear features, or hair features, or other features that are visible in the image and not obscured by the mask. In some examples, block 612 can include updating the reference information to include information about a particular type or style or pattern of face mask associated with a particular individual or group of individuals.

Figure 8:
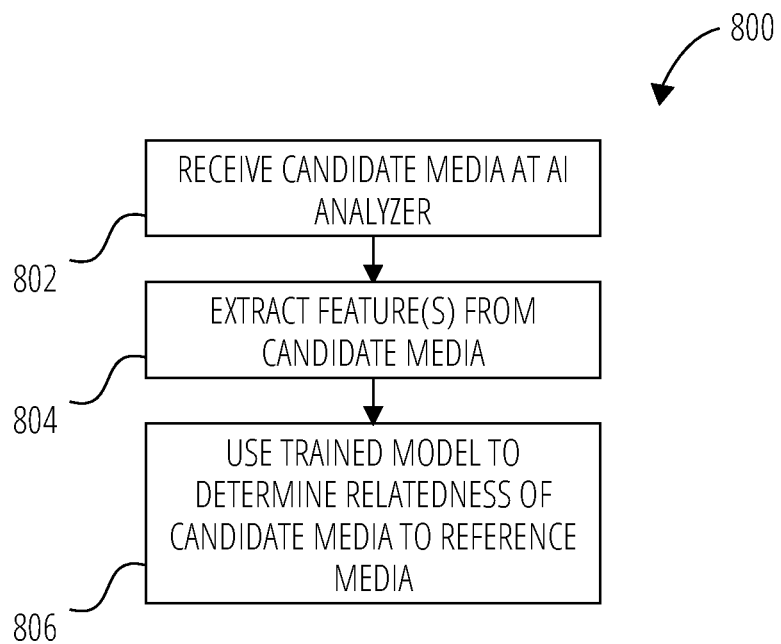
FIG. 8 illustrates generally an example of a second method that can include or use an artificial intelligence-enabled analyzer.

FIG. 8 illustrates generally an example of a second method 800 that can include determining a relatedness of candidate media to reference media. In an example, the machine-learning system 500, such as can be implemented using the first system 100 or one or more components thereof, can perform the second method 800. In an example, the first system 100 comprises the security system 412, and the first edge device 102 comprises an installed security system panel or security checkpoint device, and the first system 100 uses the processor circuit 118 to implement the machine-learning system 500 and perform the relatedness determination.

At block 802, the second method 800 can include receiving candidate media at an artificial intelligence-enabled media analyzer or processor, such as the processor circuit 118 of the first edge device 102, or the machine-learning system 500, or other device or system. At block 804, the artificial intelligence-enabled media analyzer, or a preprocessor or other system or device, can extract one or more features from the candidate media (e.g., using the feature extractor engine 202). In an example, the second method 800 includes receiving a candidate image at block 802 and extracting facial features from the candidate image at block 804. The facial features can include, for example, information about facial hair position or quantity, hair style or color, piercings, eye patches, scars, face masks, makeup colors or positions, eyebrow shape or color, blemishes, tooth count or tooth position, skin tone, wrinkles, or other characteristic that is apparent from or mineable from an image using, e.g., the image processor circuit 116. In an example, the second method 800 includes receiving a candidate image at block 802 and extracting vehicle appearance features from the candidate image at block 804. The vehicle appearance features can include, for example, information about vehicle color, shape, scratches, dents, tire type or rim characteristics, cleanliness, presence, absence, or shape of mechanical features like spoilers or sunroofs, window reflectivity or reflections, passengers, decals, or other characteristic that is apparent from or mineable from an image using, e.g., the image processor circuit 116. In an example, the second method 800 includes receiving a candidate audio sample at block 802 and extracting audio spectrogram information from the sample at block 804, or other time-frequency information about the sample, or other characteristic that is apparent from or mineable from an audio sample using, e.g., the audio processor circuit 112.

At block 806, the second method 800 can include using a trained model to determine a relatedness of the candidate media, such as received at block 802, to a reference. The reference can include media that is of the same media type (e.g., image, video, audio, etc.) as a type of the candidate media. Using the trained model can include using the machine-learning system 500, using a neural network, or using another type of model-based, artificial intelligence processor that is trained on or uses information about reference media.

Figure 9:
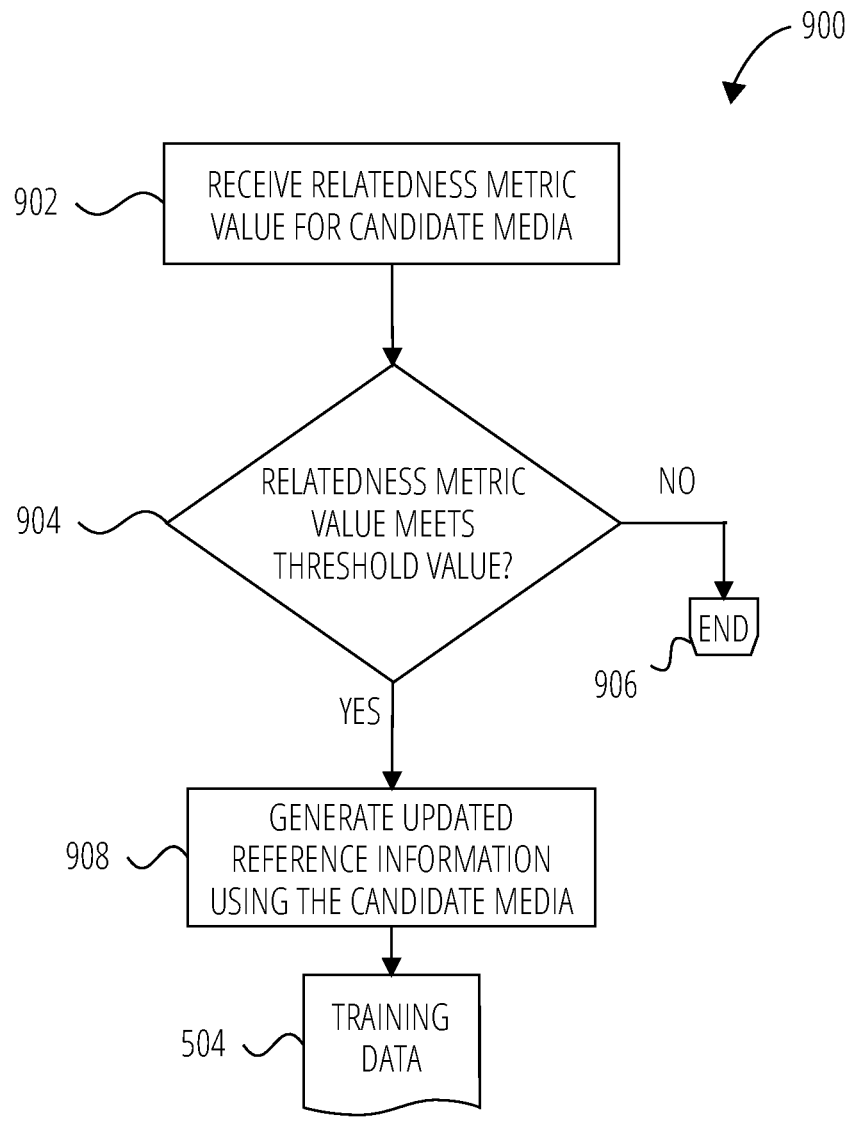
FIG. 9 illustrates generally an example of a third method that can include or use an artificial intelligence-enabled analyzer.

FIG. 9 illustrates generally an example of a third method 900 that can include determining whether a relatedness metric meets a specified threshold value. In an example, the machine-learning system 500, such as can be implemented using the first system 100 or one or more components thereof, can perform the third method 900. In an example, the first system 100 comprises the security system 412, and the first edge device 102 comprises an installed security system panel or security checkpoint device, and the first system 100 uses the processor circuit 118 to implement the machine-learning system 500 and perform the determination about whether the relatedness metric meets a threshold condition.

At block 902, the third method 900 can include receiving a relatedness metric, or value of a relatedness metric, about a candidate media object. In an example, the relatedness metric as-received can include a numeric value that represents a confidence that the candidate media object is the same as, or in a known manner corresponds to, a target media object or reference. The target media object or reference can be known by or trained into the system. At decision block 904, the third method 900 can include determining whether the relatedness metric meets or exceeds a specified threshold value. That is, decision block 904 can include determining whether the system (e.g., using the machine-learning system 500) indicates a high or low level of confidence that the candidate media object corresponds to the target media object. If the relatedness metric value does not meet or exceed the specified threshold value, then the third method 900 can proceed to and terminate at block 906. If the relatedness metric value does meet or exceed the specified threshold value, then the third method 900 can proceed to block 908. At block 908, the third method 900 can include generating updated reference information using the candidate media. The updated reference information can optionally be provided as training data 504, such as for the machine-learning system 500. By automatically providing updated or new training data to the system, the system can evolve over time to recognize the same individuals as they may change over time in appearance or behavior. If greater than a particular amount of change is detected at one time, then the relatedness metric can be low and, in an example, the system can be configured to appeal to an authority such as a system administrator to determine whether or when to update training data.

Figure 10:
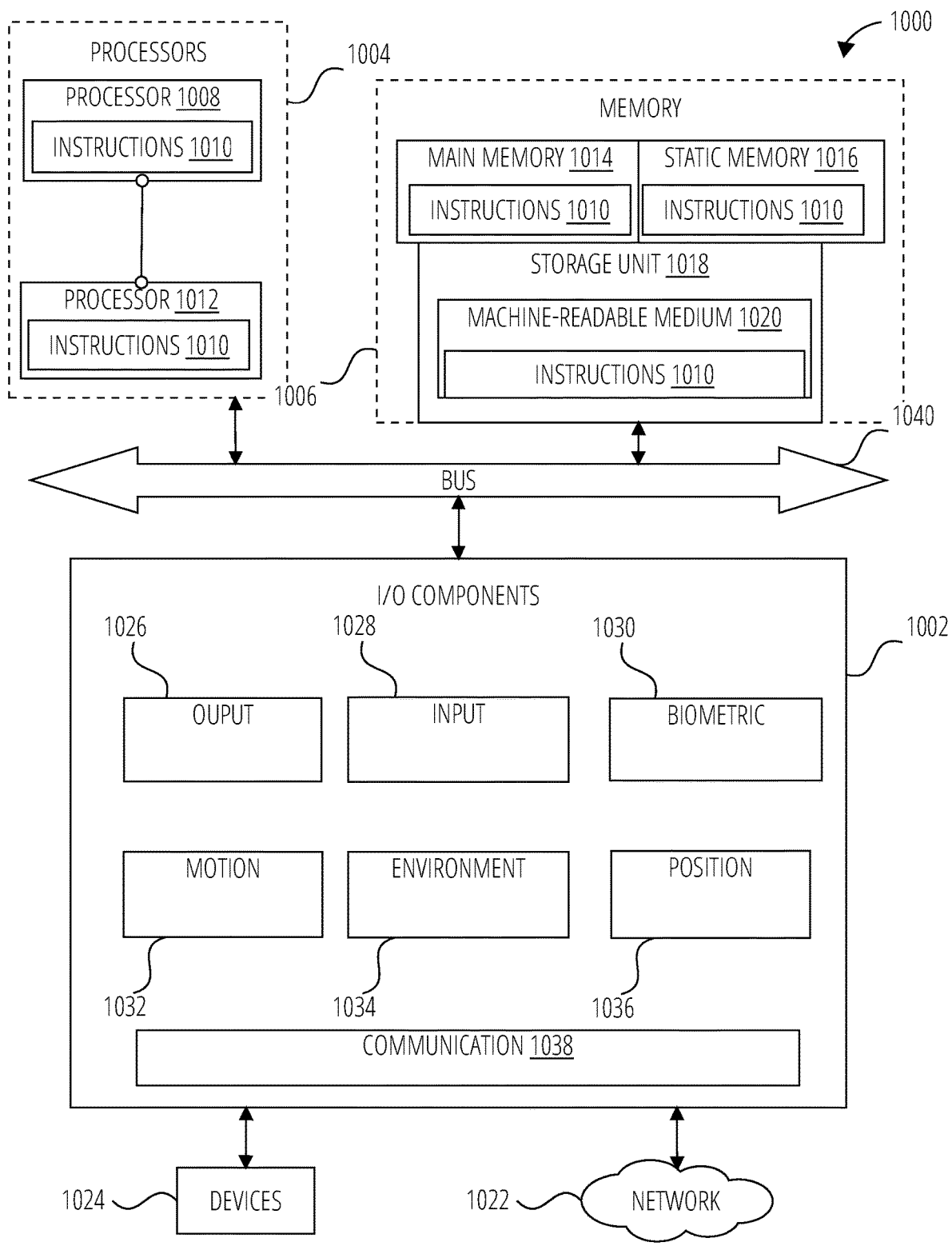
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described, for example, as an artificial intelligence-enabled analyzer that is configured to implement one or more of neural networks, machine learning algorithms, or other automated decision-making algorithm. The machine 1000 can operate as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance) or other smart device, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory 1006, and I/O components 1002, which may be configured to communicate with each other via a bus 1040. In an example embodiment, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1008 and a Processor 1012 that execute the instructions 1010. The term "Processor" is intended to include multi-core processors that may comprise two or more independent processors (sometimes referred to as "cores") that may execute instructions contemporaneously. Although FIG. 10 shows multiple processors 1004, the machine 1000 may include a single Processor with a single core, a single Processor with multiple cores (e.g., a multi-core Processor), multiple processors with a single core, multiple processors with multiples cores, or any combination thereof. In an example, the processors 1004 can include or comprise one or more of the processors in the first system 100.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine or the type of media to be received or provided or processed. For example, portable machines such as mobile phones may include a touch input device or other such input mechanisms, while a headless server machine will likely not include such a touch input device. It will be appreciated that the I/O components 1002 may include many other components that are not shown in FIG. 10. In various example embodiments, the I/O components 1002 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope). The environmental components 1034 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1036 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and/or memory of the processors 1004) and/or storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed embodiments. The instructions 1010 may be transmitted or received over the network 1022, using a transmission medium, via a network interface device (e.g., a network interface Component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Various aspects of the present disclosure can help provide a solution to the authentication and enrollment-related problems identified herein.

In an example, Aspect 1 can include or use subject matter such as an apparatus, a system, or a device, that can include or use a method for machine learning-based authentication. Aspect 1 can include receiving reference information about a target media object, receiving test media including information about a candidate media object, determining a relatedness metric indicating a magnitude of relatedness of the target media object and the candidate media object, and based on a value of the relatedness metric, at least one of (a) generating updated reference information using the test media object, and (b) providing a validation request to an administrator, the validation request including one or more of the relatedness metric, information about the target media object, and information about the candidate media object.

Aspect 2 can include or use features of Aspect 1, wherein receiving the test media can include receiving at least one of acoustic information or image information using a microphone or a video camera, respectively, of a security system panel.

Aspect 3 can include or use features of Aspect 2, wherein receiving the reference information about the target media object can include receiving reference audio information or reference image information from a reference media database remote from the security system panel.

Aspect 4 can include or use features of any of the preceding aspects, wherein receiving the reference information can include receiving reference image information about a first physical article, and receiving the test media can include receiving a test image including information about a candidate physical article, and determining the relatedness metric can include determining a metric that indicates a magnitude of relatedness of the first physical article and the candidate physical article.

Aspect 5 can include or use features of Aspect 4, wherein determining the metric that indicates the magnitude of relatedness of the first physical article and the candidate physical article can include applying machine learning to analyze the information about the candidate physical article in view of the first physical article.

Aspect 6 can include or use features of Aspect 4, wherein determining the metric that indicates the magnitude of relatedness of the first physical article and the candidate physical article can include applying the information about the candidate physical article to a neural network-based classifier to determine a likelihood that the candidate physical article is the same as the first physical article.

Aspect 7 can include or use features of any of the preceding aspects, wherein receiving the reference information can include receiving reference audio information, and receiving the test media can include receiving information about candidate audio information, and determining the relatedness metric can include determining a metric that indicates a magnitude of relatedness of the reference audio information and the candidate audio information.

Aspect 8 can include or use features of Aspect 7, wherein determining the metric that indicates the magnitude of relatedness of the reference audio information and the candidate audio information can include applying machine learning to analyze the information about the candidate audio information in view of the reference audio information.

Aspect 9 can include or use features of Aspect 7, wherein determining the metric that indicates the magnitude of relatedness of the reference audio information and the candidate audio information can include applying the information about the candidate audio information to a neural network-based classifier to determine a likelihood that the candidate audio information and the reference audio information are from a common source.

Aspect 10 can include or use features of Aspect 9, and can further include determining a likelihood that the candidate audio information and the reference audio information comprise words spoken by the same individual.

Aspect 11 can include or use the features of any of Aspects 7-10, wherein receiving the test media can include receiving an acoustic sample that can include one or multiple spoken words.

Aspect 12 can include or use features of any of the preceding aspects, and can further include a method for authentication. The example of Aspect 12 can include receiving reference image information about a target object, receiving a test image including information about a candidate object, and determining a relatedness metric indicating a magnitude of relatedness of the target object and the candidate object. In an example, Aspect 12 can include, based on a value of the relatedness metric, at least one of (a) generating updated reference image information using the test image and (b) providing a validation request to an administrator, the validation request including one or more of the relatedness metric, information about the target object, and information about the candidate object.

Aspect 13 can include or use features of Aspect 12, wherein determining the relatedness metric can include applying machine learning to analyze the information about the candidate object in view of the reference image information about the target object.

Aspect 14 can include or use the features of any of Aspects 12 or 13, wherein determining the relatedness metric can include applying the information about the candidate object to a neural network-based classifier to determine a likelihood that the candidate object in the test image is the same as the target object.

Aspect 15 can include or use the features of any of Aspects 12-14, and can further include generating the updated reference image information using the test image when the relatedness metric indicates at least a specified minimum threshold amount of similarity between the target object and the candidate object.

Aspect 16 can include or use the features of any of Aspects 12-15, and can further include providing the validation request to the administrator when the relatedness metric indicates at least a specified minimum threshold amount of dissimilarity between the target object and the candidate object.

Aspect 17 can include or use the features of any of Aspects 12-16, wherein receiving the test image can include receiving a still image or a series of images from a camera coupled to a security system.

Aspect 18 can include or use features of Aspect 17, wherein receiving the still image or the series of images can include using a camera at a control panel of a security system.

Aspect 19 can include or use the features of any of Aspects 12-18, wherein receiving the reference image information about the target object can include receiving the reference image information from a reference image database.

Aspect 20 can include or use the features of any of Aspects 12-19, wherein receiving the reference image information can include receiving reference image information about a face of a first person, and wherein the test image can include information about a face of the first person or a different person.

Aspect 21 can include or use features of Aspect 20, wherein receiving the reference image information about a face of the first person can include receiving information about the face of the first person when the first person is without a face mask, and wherein the test image can include information about a face of the first person when the first person is wearing a partial face mask.

Aspect 22 can include or use the features of any of Aspects 20 or 21, wherein the reference image information about the face of the first person can be received at a first time when the first person has first facial characteristics, and wherein the test image can include information about the face of the first person at a second time when the first person has different second facial characteristics.

Aspect 23 can include or use the features of any of Aspects 12-22, wherein receiving the reference image information can include receiving reference image information about a scene of an environment, and wherein the test image can include information about a subsequent scene of the same environment.

Aspect 24 can include or use the features of any of Aspects 12-23, wherein receiving the reference image information can include receiving reference image information that can include an image of a first vehicle, and the test image can include information about the first vehicle or a different vehicle.

Aspect 25 can include or use features of Aspect 24, wherein receiving the reference image information can include receiving information about one or more reference attributes of the first vehicle, and the reference attributes of the first vehicle can be determined using the image of the first vehicle. Aspect 25 can further include identifying a second vehicle in the test image, and identifying candidate attributes of the second vehicle using the test image, and determining the relatedness metric can include comparing the reference attributes of the first vehicle and the candidate attributes of the second vehicle.

Aspect 26 can include or use the features of any of Aspects 12-25, and can further include receiving a validation result from the administrator and conditionally updating the reference image information using the test image based on the validation result.

Aspect 27 can include or use features of Aspect 26, wherein updating the reference image information can include providing the test image to a neural network-based classifier that can include the reference image information about the target object.

Aspect 28 can include or use the features of any of Aspects 26 or 27, wherein updating the reference image information can include providing the test image to a machine learning system, and the machine learning system can be configured to recognize an evolutionary characteristic between the test image and the reference image information and to apply the evolutionary characteristic to enable recognition of other candidate objects in other test images.

Aspect 29 can include or use the features of any of Aspects 12-28, and can further include determining an elapsed time between acquisition of the reference image information and receiving the test image, and providing the validation request to the administrator when the elapsed time exceeds a specified threshold elapsed time limit.

Aspect 30 can include a system for machine learning-based authentication, such as can be used with or used to perform features of Aspects 1-29. In an example, the system of Aspect 30 can include an authority device configured to maintain reference information about one or more target media objects, and at least one edge device, remote from the authority device and in data communication with the authority device. The edge device can include a processor configured to perform instructions that configure the processor to: receive reference information about a target media object from a local database or from the authority device, receive test media including information about a candidate media object, determine a relatedness metric indicating a magnitude of relatedness of the target media object and the candidate media object, and based on the relatedness metric as-determined, at least one of: (a) generate updated reference information using the information about the candidate media object, and (b) provide a validation request to the authority device, the validation request including one or more of the relatedness metric and the information about the candidate media object.

Aspect 31 can include or use features of Aspect 30, wherein the authority device can be configured to receive the validation request from the edge device and update the reference information based on the information about the candidate media object.

Aspect 32 can include or use the features of any of Aspects 30 or 31, wherein the authority device can receive the validation request from the edge device and, in response, provide an access control instruction to the edge device.

Aspect 33 can include or use the features of Aspect 32, wherein the edge device can be configured to use the access control instruction from the authority device to control operation of a physical barrier.

Aspect 34 can include or use the features of Aspect 32 or 33, wherein the edge device is configured to use the access control instruction from the authority device to actuate an alarm.

Aspect 35 can include or use the features of any of Aspects 30-34, wherein the processor of the edge device can generate the updated reference information using the information about the candidate media object when the relatedness metric as-determined meets a specified relatedness threshold.

Aspect 36 can include or use the features of any of Aspects 30-35, wherein the processor of the edge device can provide the validation request to the authority device when the relatedness metric as-determined fails to meet a specified relatedness threshold.

Aspect 37 can include or use the features of any of Aspects 30-36, wherein the authority device can update the reference information about the one or more target media objects using data received from a system administrator.

Each of these non-limiting Aspects can stand on its own, or can be combined in various permutations or combinations with one or more of the other Aspects, examples, or features discussed elsewhere herein.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for authenticating, the method comprising:
   receiving reference image information about a face of a first person, wherein the reference image information about the face of the first person includes information about the face of the first person when the face of the first person is fully visible without the first person wearing a face mask;
   receiving a test image including information about a face of an unknown person when the face of the unknown person is partially obscured by the unknown person wearing a partial face mask; and
   determining a relatedness metric indicating at least a numerical value of similarity between the first person and the unknown person by comparing a plurality of features of the face of the first person and the face of the unknown person, and based on the relatedness metric at least one of:
      generating updated reference image information using the test image; and
      providing a validation request to an administrator, wherein the validation request includes the relatedness metric.

2. The method of claim 1, wherein the partial face mask covers less than all of the face of the unknown person.

3. The method of claim 1, wherein determining the relatedness metric includes applying the information about the test image to a neural network-based classifier to determine a likelihood that the unknown person in the test image is the first person.

4. The method of claim 1, wherein the reference image information about the face of the first person is received at a first time when the first person has first facial characteristics, and wherein the test image includes information about the face of the first person at a second time when the first person has different second facial characteristics.

5. The method of claim 1, comprising receiving reference image information about a first vehicle from a reference image of the first vehicle, wherein the test image includes information about the first vehicle or a different vehicle.

6. The method of claim 5, wherein receiving the reference image information about the first vehicle includes receiving information about one or more reference attributes of the first vehicle, wherein the one or more reference attributes of the first vehicle are determined using the reference image of the first vehicle, and the method further comprising:
   identifying a second vehicle in the test image; and
   identifying candidate attributes of the second vehicle using the test image;
   wherein determining the relatedness metric includes comparing the one or more reference attributes of the first vehicle and the candidate attributes of the second vehicle.

7. The method of claim 1, further comprising:
   receiving a validation result from the administrator; and
   updating the reference image information using the test image based on the validation result, wherein updating the reference image information includes providing the test image to a machine learning system.

8. The method of claim 7, wherein the machine learning system is configured to recognize an evolutionary characteristic between the test image and the reference image information and to apply the evolutionary characteristic to enable recognition of other candidate objects in other test images.

9. A method for authenticating, the method comprising:
   receiving reference image information about a first object;
   receiving a test image including information about a second object;
   determining an elapsed time between receiving the reference image information and receiving the test image; and
   responsive to the elapsed time exceeding a specified threshold elapsed time limit,
   providing a validation request to an administrator, wherein the validation request includes one or more of a relatedness metric, information about the first object, or information about the second object, wherein the relatedness metric indicates a magnitude of relatedness of the first object to the second object.

10. The method of claim 9, comprising determining the relatedness metric using a neural network-based classifier to determine a likelihood that the second object is the same object as the first object.

11. The method of claim 9, wherein the information about the second object includes information from a sensor, wherein the sensor includes one or more of an image sensor, an audio sensor, a biometric sensor, or an environmental condition sensor.

12. The method of claim 11, comprising determining the relatedness metric including transmitting at least one of the information about the second object or the information from the sensor to a neural network-based classifier to determine a likelihood that the second object in the test image is the first object.

13. The method of claim 9, further comprising:
receiving a validation result from the administrator; and
updating the reference image information using the test image based on the validation result, wherein updating the reference image information includes providing the test image to a machine learning system, and wherein the machine learning system is configured to recognize an evolutionary characteristic between the test image and the reference image information and to apply the evolutionary characteristic to enable recognition of other candidate objects in other test images.

14. A system for remote authentication, the system comprising:
an authorization device to maintain reference information about one or more objects; and
at least one edge device, remote from and communicatively coupled to the authorization device, wherein the at least one edge device includes processing circuitry to:
receive reference information about a target object from at least one of a local database or the authorization device, wherein the reference information includes information about a face of a first person when the face of the first person is fully visible without the first person wearing a face mask;
receive a test image including information about a candidate object, wherein the test image includes information about the face of the first person when the face of the first person is partially obscured by the unknown person wearing a partial face mask;
determine an elapsed time between acquisition of the reference information and the test image; and
determine a relatedness metric indicating at least a numerical value of similarity between the target object and the candidate object by comparing a plurality of features of the face of the first person and the face of the unknown person, and based on the relatedness metric, at least one of:
generate updated reference information using the test image; and
provide a validation request to the authorization device, wherein the validation request includes the relatedness metric, and is provided to the authorization device when the elapsed time exceeds a specified threshold elapsed time limit.

15. The system of claim 14, wherein the authorization device is configured to receive the validation request from the at least one edge device and update the reference information based on the information about the candidate object.

16. The system of claim 15, wherein the authorization device is further configured to provide an access control instruction to the at least one edge device in response to receiving the validation request, and wherein the at least one edge device is configured to use the access control instruction to control operation of a physical barrier or generate an alert.

17. The system of claim 14, wherein the processing circuitry is further to:
generate updated reference information using information about the candidate object when the relatedness metric as-determined, meets or exceeds a specified relatedness threshold.

18. The system of claim 14, wherein the authorization device is configured to update the reference information about the target object using data received from at least one of a system administrator or one or more sensors communicatively couple to the authorization device.

19. A method for authenticating, the method comprising:
receiving reference image information about a face of a first person, wherein the reference image information about the face of the first person includes information about the face of the first person when the face of the first person is fully visible without the first person wearing a face mask;
receiving a test image including information about a face of an unknown person when the face of the unknown person is partially obscured by the unknown person wearing a partial face mask; and
determining a relatedness metric indicating a numerical value of similarity of the faces of the first person and the unknown person by comparing a plurality of features of the face of the first person and the face of the unknown person, and based on the relatedness metric at least one of:
generating updated reference image information using the test image; and
providing a validation request to an administrator, wherein the validation request includes one or more of the relatedness metric, information about the first person, or information about the unknown person,
wherein the information about the face of the first person when the face of the first person is fully visible includes information about the face of the first person when the first person is without a face mask, and wherein the information about the face of the first person when the face of the first person is partially obscured includes information about a face of the first person when the first person is wearing a partial face mask.

* * * * *